US012664623B2

(12) United States Patent
Schmidt et al.

(10) Patent No.: US 12,664,623 B2
(45) Date of Patent: Jun. 23, 2026

(54) MEASUREMENT TECHNIQUES FOR CORRECTING IMAGES WITH EXTENDED DEPTH OF FIELD

(71) Applicants: Carl Zeiss Industrielle Messtechnik GmbH, Oberkochen (DE); Carl Zeiss Microscopy GmbH, Jena (DE)

(72) Inventors: Sören Schmidt, Jena (DE); Tomas Aidukas, Brugg (CH); Dirk Seidel, Jena (DE); Daniel Plohmann, Lauingen (DE)

(73) Assignee: Carl Zeiss Microscopy GmbH, Jena (DE)

( * ) Notice: Subject to any disclaimer, the term of this patent is extended or adjusted under 35 U.S.C. 154(b) by 371 days.

(21) Appl. No.: 18/357,928

(22) Filed: Jul. 24, 2023

(65) Prior Publication Data

US 2024/0029216 A1 Jan. 25, 2024

(30) Foreign Application Priority Data

Jul. 25, 2022 (DE) .......................... 102022118582.6

(51) Int. Cl.
G06T 5/80 (2024.01)
G06T 5/50 (2006.01)
(Continued)

(52) U.S. Cl.
CPC .................. G06T 5/80 (2024.01); G06T 5/50 (2013.01); G06T 7/571 (2017.01); G06T 7/80 (2017.01);
(Continued)

(58) Field of Classification Search
CPC .. G06T 5/80; G06T 7/80; G06T 7/571; G06T 5/50; G06T 2207/10056;
(Continued)

(56) References Cited

U.S. PATENT DOCUMENTS 7,177,740 B1 * 2/2007 Guangjun ........... G01M 17/027
73/146
8,311,311 B2 11/2012 Bryll
(Continued)

FOREIGN PATENT DOCUMENTS

DE 102015110289 A1 * 12/2016 ............. G06T 7/571
DE 102021111706 B4 * 4/2025 ............. G06T 7/001
(Continued)

OTHER PUBLICATIONS

Xurong; Gong et al. "Defocus Force-Guided Precision Autofocus of Hand-Eye Robot System", Nov. 2024, IEEE (Year: 2024).*
(Continued)

*Primary Examiner* — John Villecco
*Assistant Examiner* — Alejandro Hernandez
(74) *Attorney, Agent, or Firm* — Miller Johnson

(57) ABSTRACT

A computer-implemented method includes receiving a focal image stack. The focal image stack includes multiple images of a measurement object. Each of the images captures a region of a surface of the measurement object with a defined focal plane position in a depth direction. The defined focal plane positions of the plurality of images are different from each other. The method includes generating an initial image with an extended depth of field in the depth direction based on the focal image stack. The method includes generating a corrected image by correcting a set of imaging errors in the initial image. The set of imaging errors includes a distortion error.

25 Claims, 23 Drawing Sheets

(51) Int. Cl.

| | |
|---|---|
| *G06T 7/571* | (2017.01) |
| *G06T 7/80* | (2017.01) |
| *H04N 23/959* | (2023.01) |

(52) U.S. Cl.
CPC . *H04N 23/959* (2023.01); *G06T 2207/10056* (2013.01); *G06T 2207/10148* (2013.01)

(58) Field of Classification Search
CPC ............. G06T 2207/10148; G06T 7/10; G06T 7/0004; G02B 21/0016; G02B 21/0004; G02B 21/367; G02B 21/241; G01B 11/005; H04N 23/959
See application file for complete search history.

(56) References Cited

U.S. PATENT DOCUMENTS

| | | | | |
|---|---|---|---|---|
| 9,064,308 | B2 * | 6/2015 | Flanders | .................. G06T 5/50 |
| 9,161,014 | B2 | 10/2015 | Prantl | |
| 9,292,926 | B1 * | 3/2016 | Tang | ................... H04N 13/128 |
| 11,763,421 | B2 * | 9/2023 | Wu | ....................... G06T 3/4007 |
| | | | | 382/162 |
| 11,863,881 | B2 * | 1/2024 | Feng | ......................... G06T 5/94 |
| 12,266,099 | B2 * | 4/2025 | Hirose | ................. G06T 7/0012 |
| 2005/0078884 | A1 * | 4/2005 | Yi | .............................. G06T 5/75 |
| | | | | 382/269 |
| 2009/0088999 | A1 * | 4/2009 | Bryll | ................. G01B 11/0608 |
| | | | | 382/141 |
| 2010/0149406 | A1 * | 6/2010 | Katakura | ....... G02B 15/144515 |
| | | | | 359/689 |
| 2013/0201186 | A1 * | 8/2013 | Winter | ................ H04N 13/122 |
| | | | | 345/419 |
| 2014/0010471 | A1 * | 1/2014 | Flanders | .................. G06T 5/70 |
| | | | | 382/255 |

| | | | | |
|---|---|---|---|---|
| 2015/0063726 | A1 * | 3/2015 | Matsumoto | ............... G06T 5/94 |
| | | | | 382/309 |
| 2017/0102550 | A1 * | 4/2017 | Ponomarev | ........... B60K 35/81 |
| 2018/0253877 | A1 * | 9/2018 | Kozub | ...................... G06T 5/50 |
| 2018/0288397 | A1 * | 10/2018 | Lee | ....................... H04N 13/204 |
| 2020/0074674 | A1 * | 3/2020 | Guo | ....................... G06V 20/54 |
| 2020/0096654 | A1 * | 3/2020 | Saito | ..................... G01T 1/2018 |
| 2020/0365100 | A1 * | 11/2020 | Matsui | .................... G09G 5/00 |
| 2021/0012515 | A1 * | 1/2021 | Fleureau | ................. G06T 7/001 |
| 2021/0168348 | A1 * | 6/2021 | Laganakos | ........... H04N 23/959 |
| 2022/0215506 | A1 * | 7/2022 | Wu | ......................... H04N 23/88 |
| 2022/0237813 | A1 * | 7/2022 | Feng | ......................... G06T 5/50 |
| 2022/0358631 | A1 * | 11/2022 | Baum | ....................... G06T 7/55 |
| 2023/0012219 | A1 * | 1/2023 | Feng | ......................... G06T 5/50 |
| 2024/0062336 | A1 * | 2/2024 | Yuan | ...................... G06V 10/24 |
| 2025/0315968 | A1 * | 10/2025 | Jiao | .......................... G06T 7/571 |

FOREIGN PATENT DOCUMENTS

| | | | | |
|---|---|---|---|---|
| EP | 2598836 | A1 | 6/2013 | |
| JP | 2012221958 | A * | 11/2012 | ........... H01J 37/153 |
| WO | 2012013686 | A1 | 2/2012 | |

OTHER PUBLICATIONS

German office action received for DE10 2022 118 582.6 dated Sep. 26, 2024, 12 pages.

Wikipedia, "Rauschunterdrückungsverfahren (noise reduction methods)," 12 pages, last accessed Dec. 30, 2024 at: https://de.wikipedia.org/wiki/Rauschunterdr%C3%BCckungsverfahren.

Shree K. Nayar: Shape from Focus System; Department of Computer Science, Columbia University, New York, N.Y. 10027, Published 1992.

Examination Report for DE application 10 2022 118 582.6, dated Apr. 4, 2023.

* cited by examiner

40

Receiving focal image stack — 42

Determining sharpness value — 44

Fitting function — 46

Determining depth value — 48

Generating image with extended depth of field — 50

Correcting one or more imaging errors — 52

60

Determining first and second correction values — 62

Determining at least one distortion value — 63

Illuminating workpiece — 64

Varying distance — 66

Capturing images — 68

Generating corrected image with extended depth of field — 70

Outputting generated corrected image — 72

62

80 — Generating image

82 — Segmenting image points

84 — Determining first and second correction value

86 — Interpolating first and second correction values

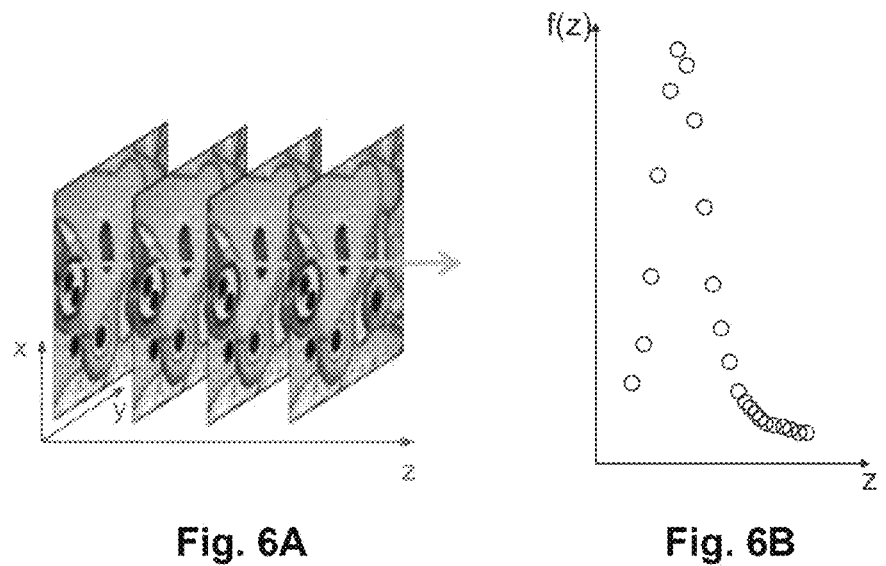
Fig. 6A
Fig. 6B
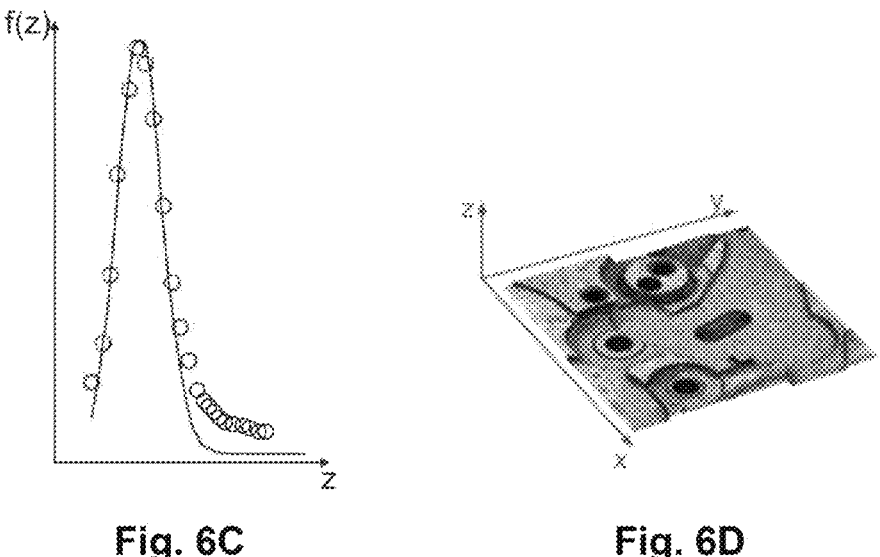
Fig. 6C
Fig. 6D

MEASUREMENT TECHNIQUES FOR CORRECTING IMAGES WITH EXTENDED DEPTH OF FIELD

CROSS-REFERENCE TO RELATED APPLICATIONS

This application claims priority to German patent application DE 10 2022 118 582.6, filed Jul. 25, 2022, the entire disclosure of which is incorporated by reference.

FIELD

The present disclosure relates to measurement technology and more particularly to optical measurements with an extended depth of field.

BACKGROUND

A method of this type and an apparatus of this type are known from the document EP2 598 836 B1, for example. Measuring apparatuses for measuring the surface of a workpiece—also called a measurement object—are generally known in the prior art. Measuring apparatuses that can measure pieces of 3D information of a workpiece are required, in principle, in industrial metrology. For this purpose, various types of sensors can be employed in measuring apparatuses of this type in order to capture the coordinates of a workpiece to be measured.

Furthermore, optical measuring apparatuses in which optical sensors are used are also known. The optical sensors enable the coordinates of a workpiece to be captured without contact. In optical measuring apparatuses, the workpiece to be measured is clamped on a table used as a workpiece holder. In this case, the table forms an X-Y plane. Perpendicularly from this plane, i.e. in the Z-direction of a Cartesian coordinate system, the optical sensor is spaced apart from the workpiece to be measured.

Since conventional optical measuring apparatuses, such as microscopes or coordinate measuring machines, for example, can only record 2D data, the image depth or depth information in the Z-direction is determined using an additional technique.

A non-invasive and expedient solution consists in determining the depth information in the Z-direction using a plurality of optical measurements. Image unsharpness caused by optical defocussing changes in a predictable way. The optical system of the optical sensor has a focal plane, which is a plane of greatest sharpness. If an object point located on the surface of the workpiece is moved toward the focal plane, the image representation of the object point becomes sharper. If the object point is moved away from the focal plane, the image representation of the object point becomes less sharp. If the object point is arranged in the focal plane, the image representation of the object point is the sharpest. The image unsharpness can thus be monitored by varying the distance between the workpiece and the optical system. A focal image stack is generated by recording images while the workpiece is moved through the focus. On the basis of the focal image stack, a piece of depth information of the object points can be extracted using a technique that is called Shape from Focus (SFF).

In the SFF technique, the recorded focal image stack is first assessed with the aid of autofocus metrics, which defines in a pixel-resolved manner a local degree of sharpness for each single image. In this case, a sharpness value is determined for each image point in each image. The sharpness values are stored in a 3D sharpness matrix. Therefore, each individual image point is assigned a sharpness profile along the z-direction. Next, the maximum of each sharpness profile is determined. The maximum therefore indicates the z-position at which the sharpest imaging of an object point onto the image point takes place. From this, a piece of depth information can then be determined for each object point of the workpiece. A depth map of the region of the workpiece can be generated on the basis of the ascertained pieces of depth information. Furthermore, an image with an extended depth of field (EDOF image) can be generated on the basis of the depth map and the focal image stack.

Methods that use the SFF technique are known in microscopy. By way of example, the document EP 2 598 836 A1 discloses a method for compensating for illumination deficiencies in microscopic "Shape from Focus (SFF)," which involves firstly estimating the reflectivity of the scene using a projector camera system and then applying the microscopic "Shape from Focus (SFF)" to a stack of reflection maps instead of to the original image data.

Furthermore, methods of this type are also described in the article "Shape From Focus System" by Shree K. Nayar, IEEE Conference on Computer Vision and Pattern Recognition (CVPR), 1992, 302-308, and also in the article "Focus Variation Instruments" by Franz Helmli, chapter 7 from the book "Optical Measurement of Surface Topography," pages 131-166, Springer Verlag.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

The hitherto known methods that use the SFF technique do not take into account imaging errors.

Owing to image tilt and image curvature, real optical systems image a flat measurement object onto a curved image plane. In addition, real optical systems have a spatially dependent telecentricity error, i.e., a spatially dependent change in magnification in dependence on the defocusing. This generally leads to a change in image orientation, in other words edge movement, or a dimensional measurement error in the recorded image. The interaction of optical objective aberrations and telecentricity error can result in unexpected and complex measurement influences. In particular, measurement results can vary depending on a selected autofocus position, for example on the optical axis or at the field edge. This will be explained in more detail below for various objective aberrations, in particular for image field curvature and astigmatism.

FIG. 7 shows the imaging beam path from the exit pupil 120 to the curved image plane 126 for a flat object that is focused and imaged on a curved image plane 126 under the influence of Petzval aberration (image field curvature). This plane is also referred to as the best setting plane according to Petzval. Reference sign 122 denotes the emerging chief ray of an edge point to be imaged of the viewed object, and reference sign 124 denotes an emerging marginal ray of the central point to be imaged of the viewed object. An individual autofocus point in the image focuses the image at an individual region of the Petzval plane, with the result that not the entire image is in focus at the same time.

Distances/positions (for example L1, L2) which are measured in the image vary depending on the selected autofocus position (B1, B2), for example at the image center or image periphery. For measurement features which are near one another, the change in the autofocus position will result in a shift ("walking") under the assumption that the telecentricity error a (angle of the viewed chief ray direction in relation to the optical axis or the image field normal for B1 or B2) is the same for both points. For measurement features which are located further away, the change in the autofocus position will result in a systematic measurement error under the assumption that the telecentricity error is different for both points.

In addition to the image field curvature, real optical systems additionally have an astigmatic influence. FIG. 8 shows by way of example the astigmatism of a lens. The latter has a tangential focus 130 and a sagittal focus 132. These are offset in relation to one another in the depth direction (z-direction) around a delta 134. The tangential focus 130 can lie nearer the lens than the sagittal focus 132. The exact positions of the tangential and sagittal foci depend on the respective design of the system. The result of this is a varying best setting plane in dependence on the edge orientation. In particular, horizontal and vertical edge orientations in the object are imaged sharpest into different best setting planes. The interaction of astigmatism and telecentricity error has unexpected and complex measurement influences in this case, too. In particular, measurement results can vary depending on an autofocus position on a horizontal or vertical edge. This will be explained in greater detail below.

FIG. 9 shows by way of example for a flat object to be imaged, similar to FIG. 7, the imaging beam path from the exit pupil 120 in two different image planes 140 and 142, which are formed because imaging into different best setting planes takes place in dependence on the edge orientation owing to the astigmatism of the imaging optical unit. Generally, these sagittal and tangential setting planes do not have a simple profile over the image field, by contrast to the illustration in FIG. 9. However, for the purposes of providing a better explanation, the extreme cases of the tangential best setting plane 140 and the sagittal best setting plane 142 are shown in FIG. 9 as spherical shells that lie opposite each other.

Depending on the actual edge orientation 144, however, any desired best setting plane in between is also possible. Therefore, in dependence on the local edge orientation, the autofocus will focus into different setting planes. That is to say, at the same image position the best autofocus position is dependent on the edge orientation. Distances (for example L1, L2, D1, D2) measured in the image vary because of this in dependence on the edge-orientation-dependent autofocus in the image. In other words, in particular, measurement results vary depending on the autofocus on a horizontal or vertical line. In that case, the greater the telecentricity deviation α of the system is, the greater the error will be.

Image field curvature and astigmatism can occur at the same time. This is depicted in FIG. 10. A measurement objective having Petzval curvature and astigmatism will image the image sharpest in a best setting plane 126 between the sagittal and tangential best setting planes. The extract position between the image shells depends on edge orientations in the measurement object. In other words, a telecentricity-related measurement influence is generally influenced both by Petzval and also astigmatic autofocus influences.

Against this background, it is a technical object of the present invention to provide a method for recording and generating an image with an extended depth of field of a surface of a workpiece and a corresponding measuring apparatus, which can generate, with high accuracy, an image with an extended depth of field of a surface of a workpiece. In particular, it is an object of the present invention to provide a mechanism that is able to at least compensate for measurement influences and at the same time to ascertain an improved measurement recording with an extended plane of sharp focus.

In accordance with a first aspect of the invention, a computer-implemented method for generating a corrected image with an extended depth of field is provided, wherein the image images a region of a surface of a measurement object (that is, a workpiece or an object to be measured), with the method comprising the following steps:

receiving a focal image stack, wherein the focal image stack has a plurality of images of the workpiece or the object to be measured, wherein the images image the region of the surface of the workpiece or the object to be measured with defined focal plane positions that are different in a depth direction, wherein a focal plane position is assigned to each image of the focal image stack;

generating an image with an extended depth of field in the depth direction on the basis of the focal image stack; and correcting one or more imaging errors in the image with an extended depth of field, wherein the imaging errors to be corrected include a distortion error.

In accordance with a second aspect of the invention, a method for recording a corrected image with an extended depth of field with an optical sensor (14) of a measuring apparatus is provided, wherein the image images a region of a surface of a workpiece or an object to be measured, wherein the optical sensor and the workpiece or the object to be measured are spaced apart from one another in a depth direction, with the method comprising the following steps:

capturing a plurality of images of the region of the surface of the workpiece or the object to be measured using the optical sensor, wherein the images each image the region of the surface of the workpiece or the object to be measured with defined focal plane positions that are different in the depth direction, and wherein the captured images form a focal image stack; and generating the corrected image with an extended depth of field using the method according to the first aspect of the invention.

In accordance with a third aspect of the invention, a measuring apparatus, in particular a coordinate measuring machine or a microscope, for recording a corrected image with an extended depth of field is provided, wherein the image images a region of a surface of a workpiece or an object to be measured, wherein the measuring apparatus has a workpiece or the object to be measured holder for the workpiece or the object to be measured, an optical sensor, and a control device, wherein the optical sensor is configured to capture images of a region of the surface of the workpiece or the object to be measured, wherein the optical sensor and the workpiece or the object to be measured are spaced apart from one another in a depth direction, wherein the control device is designed to carry out the following steps:

generating the corrected image with an extended depth of field using the method according to the first aspect of the invention.

In this case, provision can be made for the control device furthermore to be designed to carry out the following steps, in particular before generating the corrected image with an extended depth of field:

controlling the optical sensor such that a plurality of images of a region of the surface of the workpiece are captured using the optical sensor, wherein the images each image the region of the surface of the workpiece with defined focal plane positions that are different in the depth direction, and wherein the captured images form a focal image stack.

In accordance with a fourth aspect of the invention, a computer program product comprising a computer program is provided which has program code for carrying out a method according to the first aspect of the invention when the computer program is executed on a measuring apparatus. Furthermore, a computer program product can also be provided which comprises instructions which, when the program is executed by a computer, cause the latter to carry out the steps of the method according to the first aspect of the invention.

Advantageously, the new method is implemented using a processing unit or a control device which may be a multi-purpose computer or a special computer, wherein an appropriate computer program or computer program product is stored and executed, wherein the computer program or the computer program product is adapted and configured to generate or record a corrected image with an extended depth of field according to the aforementioned methods.

A workpiece is understood to mean an object, in particular a measurement object, that is measured. The workpiece has a surface. Images of a region of the surface can be captured using an optical sensor of a measuring apparatus. The measuring apparatus can be in particular a coordinate measurement machine or a microscope. The optical sensor can have for example an image sensor and an optical system. The image sensor can be for example a charge-coupled semiconductor element sensor, also called CCD (charge-coupled device) sensor. The CCD sensor can be a monochrome sensor or a color sensor. The optical system can image the region of the surface of the workpiece on the image sensor. The optical system can have in particular an objective that is telecentric at least on the object side. It goes without saying that an object to be measured in the context of the present invention is also understood to be, for example, a biological cell of animal origin and/or plant origin but also, for example, a bacterium or any other object that is measured or can be measured with a microscope.

An image captured using the optical sensor has a plurality of image points. Each image point images an object point of the region of the surface of the workpiece. The number of image points thus corresponds to the number of imaged object points. Present-day optical sensors can have resolutions of several megapixels. The number of image points of a captured image and accordingly also the number of imaged object points correspond to the number of pixels of the optical sensor. The captured images can thus have several millions of image points.

During the process of capturing the images, the focal plane position of the optical sensor is varied in a depth direction relative to the workpiece in order to capture each image with a different, defined focal plane position.

In various implementations, the optical sensor and the workpiece are movable relative to one another in the depth direction, such that a distance in the depth direction between the workpiece and the optical sensor is variable. By way of example, the measuring apparatus can have a drive device configured to move the optical sensor and the workpiece relative to one another in the depth direction. During the process of capturing the images, it is then possible to vary the distance between the optical sensor and the workpiece in the depth direction in order to vary the focal plane position for each image. The depth direction can be a Z-direction of a Cartesian coordinate system, wherein the captured images are an image representation of the region of the surface of the workpiece in the X- and Y-directions. In other words, the imaging of the images is perpendicular to the depth direction. In this case, the images are recorded at different, defined distances from the workpiece. In this context, "defined" means that the distances at which the images are captured are stipulated in advance and thus known. By way of example, the images can be recorded in 50 µm steps.

Since the images are recorded at different distances from the workpiece, the focal plane or the plane of greatest sharpness of the optical sensor varies between the images. The optical setting of the optical sensor, in particular the focal distance of the objective, can remain constant in this case. Each image is captured with a different focal plane. The images thus jointly form a focal image stack. A defined distance is assigned to each image of the focal image stack. The distance of an image corresponds to a depth value in the depth direction, in particular a Z-position in the Z-direction. In other words, the captured images each image the region of the surface of the workpiece at different, defined distances from the workpiece in a depth direction, wherein a distance is assigned to each image of the focal image stack.

Alternatively, during the process of capturing the images, the change in the focal plane position can be achieved by refocusing the optical unit or varying the focal distance of the objective of the optical sensor. That is to say that each focus setting at the objective is assigned a corresponding distance between the optical sensor and the set focal plane in the depth direction. In this way, the focal plane or the plane of greatest sharpness of the optical sensor can be varied in an optical way between the images in order to form the focal image stack. The distance between the workpiece and the optical sensor can then remain constant.

Each image has the same number of image points. Each image point of an image images a corresponding object point of the workpiece from the region of the surface of the workpiece. Each image point of an image is thus assigned to a corresponding object point on the surface of the workpiece. An object point can also be referred to as a measurement point. Each object point on the surface of the workpiece has a position in the Cartesian coordinate system, in particular an X-position in the X-direction, a Y-position in the Y-direction, and a Z-position in the Z-direction. The Z-position in the Z-direction can also be referred to as depth value in the depth direction. Since the captured images each image the same region of the surface of the workpiece, the image points of the images are assigned to the same object points. In particular, the image points of the images with the same X- and Y-coordinates are assigned to the same object point. This means that each object point is assigned a respective image point from each image.

An image with an extended depth of field in the depth direction is then generated based on the recorded focal image stack. For this purpose, the focused regions of the individual images of the focal image stack are merged to form a sharp overall image. As already mentioned above, an object point is imaged sharply if it is located in the focal plane during the recording of the image. In other words, each object point is imaged most sharply in one specific focal plane position. The focal plane position at which an object point is imaged most sharply can be ascertained on the basis of the images of the recorded focal image stack. The image with an extended depth of field can then for example be composed of the image points of the images of the focal image stack that image the object points most sharply. The image with an extended depth of field can also be referred to as measurement recording. The described procedure for generating an image with an extended depth of field consequently results in a measurement recording in the best setting plane.

The drive device of the measuring apparatus can set the distance between the workpiece and the optical sensor. For this purpose, the drive device can move the workpiece holder and/or the optical sensor in the depth direction. The drive device can have for example a piezoelectric drive, a direct drive, or a spindle drive. A spindle drive is particularly suitable since it has a high resolution, can move large loads, and has a large capture range in the depth direction.

The drive device and the optical sensor can be controlled by the control device of the measuring apparatus. For this purpose, the control device can have a closed-loop control unit, for example, which can send control commands to the optical sensor and the drive device. The calculation steps for generating the corrected image with an extended depth of field can likewise be carried out by the control device of the measuring apparatus. To this end, the control device may comprise a data processing unit, for example, which carries out the steps for generating the corrected image with an extended depth of field.

As mentioned in the introductory part, imaging errors resulting from the optical system that is used for recording the focal image stack occur during the recording of the focal image stack. One of these errors is the distortion error.

Distortion is a geometric imaging error in optical systems which results in a local change in the imaging scale in the lens equation. This brings about imaging of the object to be investigated that is not true to length or scale. In other words, the distortion influences the dimensional measurability. The distortion can have a distortion center that may lie on the optical axis. The distortion center is a point of symmetry of the distortion. The distortion can be rotationally symmetric about this point of symmetry. In other words, the distortion brings about imaging that is not true to length and/or conformal. A radial direction and a tangential direction can be defined with reference to the distortion center. The radial direction and the tangential direction are perpendicular to each other.

The distortion error of an optical system consequently results in a change in scale in the x-direction and y-direction, in other words perpendicular to the depth direction. In other words, each image point has an imaging error in the x- and y-directions due to the distortion. This imaging error can increase as the distance of an image point from the optical axis increases.

The distortion can generally include a radial distortion and/or a tangential distortion. The radial distortion and the tangential distortion can be described for example by the Brown-Conrady model. The radial distortion describes the distortion, or change in scale, in the radial direction. In the case of radial distortion, the image points are thus distorted in the radial direction. The tangential distortion describes the distortion, or change in scale, in the tangential direction. In the case of tangential distortion, the image points are thus distorted in the tangential direction.

So to obtain a corrected image with an extended depth of field without any distortion error, the distortion error is thus corrected in the image with an extended depth of field. To this end, for example each image point of the image with an extended depth of field can be offset/undistorted in the x- and y-directions in order to compensate for the distortion error. In particular, each image point of the image with an extended depth of field can be offset/undistorted in the radial and optionally the tangential direction with respect to the distortion center in order to compensate for the distortion error.

In other words, the following procedure can be adopted for recording and generating a corrected image with an extended depth of field of a region of a surface of a workpiece. First, a focal image stack is recorded and processed. To this end, either the workpiece is shifted along the depth direction, or a focus unit within the objective is adapted. Within the recorded image stack, the locally sharpest point is determined for each pixel. To this end, for example, autofocus metrics can be applied in a spatially resolved manner to each image of the focal image stack, and the sharpest image point can be determined for each pixel. By processing the focal image stack, it is then possible to first compute an image with an extended depth of field. This has the advantage that the recording in the entire region captured, what is known as the field of view, can be analyzed and contains no defocused regions. However, this recording is not measurable. In addition to the conventional distortion, the image with an extended depth of field will have an additional distortion due to a telecentricity error. To compensate for these influences, the recorded image with an extended depth of field is corrected, in particular undistorted, on the basis of the known distortion. For correction purposes, for each image point of a recorded image, in particular for the image points of the image with an extended depth of field, for example, a correction value can be predetermined which indicates the distortion of the corresponding image point. By way of example, the distortion can be ascertained in advance by using a calibration object.

The procedure thus described enables the compensation of autofocus-dependent measurement errors and the generation of a measurable recording with an extended depth of field. In this way, a measurable, corrected image with an extended depth of field of a region of a surface of a workpiece which images the recorded region sharply and to scale is thus recorded or generated.

The technical object stated in the introduction is thus achieved in its entirety.

In a first configuration, the image points of the images in the focal image stack are assigned in each case to a corresponding object point on the surface of the workpiece, wherein the computer-implemented method furthermore comprises the following steps:

determining a sharpness value of each image point of each image of the focal image stack;

determining a depth value of each object point on the surface of the workpiece in the depth direction on the basis of the determined sharpness values, wherein in the generating step, the image with an extended depth of field is generated on the basis of the ascertained depth values and the focal image stack.

A sharpness value is determined for each image point. The sharpness value may also be referred to as focus value. The sharpness value specifies a measure in relation to how sharply the respective image point is depicted. By way of example, the brightness, a contrast value or a grayscale value of an image point can be considered in order to determine the sharpness value. In particular, a gradient of the brightness, of the contrast value or of the grayscale value to the surrounding image points can be determined in order to determine the focal value. The greater the gradient, the sharper the image point and the greater the focus value. The sharpness values are stored in a 3D sharpness matrix.

In order to determine the depth value of an object point, the respective image points of the focal image stack which are assigned to the corresponding object point are considered jointly. Each of these image points is from different images in this case. Consequently, each image point is assigned a different distance and accordingly a different depth value in the depth direction. Based on this, a depth value at which the object point is imaged most sharply can then be ascertained for each object point. The depth values of all object points form a depth map.

As soon as a depth value has been determined for each object point from the captured region of the surface of the workpiece, the image with an extended depth of field can be generated on the basis of the ascertained depth values of the object points and the focal image stack. In other words, the image with an extended depth of field is generated on the basis of the depth map and the focal image stack. To this end, for example for each object point, that image point, from the set of image points that are assigned to the object point, whose depth value is closest to the ascertained depth value of the object point can be taken from the focal image stack. In other words, for each object point it is possible to take that image point from the focal image stack that images the object point most sharply.

In a further configuration, the method furthermore comprises the following step:

fitting in each case a function along the depth direction to the sharpness values of those image points of the images which are assigned to the same object point, wherein the depth value of each object point on the surface of the workpiece in the depth direction is determined on the basis of a maximum of the corresponding, fitted function.

Determining the depth value of the object point involves adapting a function in or along the depth direction to the sharpness values of the corresponding image points which are assigned to the object point. The function can also be referred to as a sharpness function. As described previously, the sharpness value is maximal when the object point lies in the focal plane of the optical sensor. If the distance with respect to the workpiece is shortened or lengthened, the sharpness value decreases. The depth value of the object point can thus be determined from the maximum of the function fitted to the sharpness values of the image points of a corresponding object point. Suitable functions are particularly those which are axially symmetric with respect to a maximum, in particular with respect to a global maximum.

In a further configuration, the method furthermore comprises the following step:

fitting in each case a function along the depth direction to the sharpness values of those image points of the images which are assigned to the same object point, wherein the depth value of each object point on the surface of the workpiece (12) in the depth direction (20) is determined on the basis of a maximum of the fitted function and a residual of the fitted function.

In particular, the depth value of an object point on the surface of the workpiece in the depth direction is determined on the basis of a maximum of the corresponding, fitted function if the residual of the corresponding, fitted function is greater than a defined threshold value, while the depth value of an object point on the surface of the workpiece in the depth direction is determined by interpolation of the depth values of at least two neighboring object points if the residual of the corresponding, fitted function is equal to or less than the defined threshold value.

The residual is a measure of how much the function deviates from the ascertained sharpness values. The residual thus indicates the quality of the fit. For each object point, a function is adapted to the corresponding sharpness values. For this function, the maximum and the residual are determined. Next, it is ascertained whether the residual exceeds the threshold value. If the residual does not exceed the threshold value, the depth value of the corresponding object point is determined on the basis of the maximum of the function. If the residual does exceed the threshold value, the depth value of the corresponding object point is determined by interpolation. For the purposes of interpolation, at least two, in particular all, neighboring object points for which a depth value has already been determined are used. Artifacts in the image with an extended depth of field which may be caused for example by defocused object points or stray light are suppressed in this way.

In particular, it is possible for each object point for which the residual exceeds the threshold value to first determine the depth value on the basis of the corresponding maximum of the fitted function. The depth values of the remaining object points whose residuals do not exceed the threshold value and for which no depth value has yet been determined are then determined by interpolation of the depth values of the other object points for which a depth value has already been determined. Alternatively, it is possible to first establish the depth values for all object points on the basis of the maxima of the fitted functions. Then the depth values of the object points for which the calculated residual lies below the threshold value are discarded again. For the object points for which the depth value has been discarded again, the depth value is then determined by interpolation, as described previously.

In a further configuration, the function to be fitted is a Gaussian function, wherein the depth value of each object point corresponds to the expected value, also called median or central value, of the respective Gaussian function.

A Gaussian function has a global maximum in principle at its expected value. If a Gaussian function is thus adapted to the sharpness values of the image points of an object point, the depth value of the object point can be determined on the basis of the expected value. Furthermore, the intensity profile or the sharpness profile in the depth direction largely follows a Gaussian curve if the distance with respect to the workpiece in the depth direction is varied. Therefore, if a Gaussian curve is fitted to each point of the region to be imaged, in particular for each object point, the accuracy and reproducibility of the depth map and thus also of the image with an extended depth of field can thus be improved further.

In a further configuration, a depth value in the depth direction is assigned to each image of the focal image stack.

On the basis of the depth values of the images, it is possible to correspondingly fit the function for the image points of an object point and to determine the depth value for the corresponding object point. In this case, the depth value of the object point, in particular the z-position, results directly from the depth value at which the fitted function is maximal. In particular, the depth values of the images can succeed one another in discrete steps. By way of example, the images can be recorded in 50 μm steps. This means that the distance of the images in the depth direction with respect to the workpiece changes by 50 μm from image to image, in particular becomes larger or smaller.

In a further configuration, the sharpness value of each image point is determined on the basis of a sharpness of the image point.

As already explained previously, the sharpness value of an image point can be determined for example on the basis of a gradient with respect to the surrounding image points of the corresponding image.

In a further configuration, each point of the image with an extended depth of field is assigned at least one distortion value for the purposes of correcting the distortion error, wherein a position of each point of the image with an extended depth of field is corrected perpendicular to the depth direction on the basis of the at least one distortion value.

The distortion value is a correction value for the distortion of the respective image point. The at least one distortion value is predetermined in various implementations. The at least one distortion value determines how the position of a point of the image with an extended depth of field is to be varied perpendicular to the depth direction, that is to say in the x- and y-directions. In other words, the distortion value indicates how the point should be shifted in the x- and/or y-directions for correction purposes. In particular, the at least one distortion value can determine how the point should be shifted in the radial and/or tangential direction with respect to the distortion center in order to correct radial distortion and tangential distortion. By correcting (i.e., undistorting) the position of each point of the image with an extended depth of field on the basis of the at least one distortion value, a measurable measurement recording that is to scale is generated.

In a further configuration, each point of the image with an extended depth of field is assigned a first distortion value and a second distortion value, wherein the position of each point of the image with an extended depth of field is corrected in a first direction on the basis of the first distortion value and is corrected in a second direction on the basis of the second distortion value.

In this way, the distortion of the point can be corrected in two different directions. The first and second directions are perpendicular to the depth direction. In various implementations, the first and second directions are not parallel to one another, for example, they may be perpendicular to one another. By way of example, the first direction can be the x-direction and the second direction can be the y-direction. In this case, the first distortion value serves for correcting a distortion in the x-direction, and the second distortion value serves for correcting a distortion in the y-direction. Alternatively, the first direction can also be the radial direction, and the second direction can be the tangential direction with respect to the distortion center. In this case, the first distortion value serves for correcting the radial distortion, and the second distortion value serves for correcting the tangential distortion.

In a further configuration, the imaging errors to be corrected furthermore include an astigmatism error.

All optical systems have imaging errors, also referred to as optical aberrations, within the manufacturing tolerances. The aberrations lead to a systematic measurement error in the calculated depth values. Astigmatism poses a particular problem because it distorts the depth values. At least the first- and second-order aberrations in the aberration scheme according to Zernike is taken into account and corrected. The proposed correction mechanism makes it possible to carry out a digital aberration correction, which increases the accuracy further.

In a further configuration, the astigmatism error is corrected before the distortion error.

As has already been explained in the introductory part, the distances measured in the image (i.e., the scale) change in dependence on the edge-orientation-dependent autofocus. The greater the telecentricity deviation of the system is, the greater this error will be. In other words, astigmatism of the optical system results in the scale changing in dependence on the edge orientation. That means that due to astigmatic image influences, the determined best (sharpest) image point will no longer lie on the best setting plane according to Petzval, but will, in dependence on the edge orientation, average out between the sagittal and the tangential best setting planes. In order to minimize telecentricity-related measurement influences, it is therefore possible to determine an astigmatically compensated (corrected) image with an extended depth of field. For this purpose, an image with an extended depth of field is calculated on the edge-orientation-independent best setting plane according to Petzval, and the distortion correction is then carried out for this image of extended depth of field.

In a further configuration, for the purpose of correcting the astigmatism error, an angle map of the region of the surface of the workpiece is generated, wherein a first correction value and a second correction value are assigned to each point of the image with an extended depth of field, wherein the depth value of each point of the image with an extended depth of field is corrected on the basis of the first correction value, the second correction value and the angle map.

Astigmatism is an aberration of the "oblique" rays. An obliquely incident beam of rays is refracted to different extents in the meridional and sagittal planes. A lens is perspectively shortened in the direction of the meridional plane, which results in a shorter focal length than in the sagittal plane. In other words, astigmatism is direction-dependent, in particular dependent on directions of the edges in the image representations of the images. The astigmatism can be described for each point using an angle-dependent function, in particular model or fit function, with at least two parameters having the first and second correction values. In other words, the astigmatism model is an adaptation of the depth value deviation represented by way of the circle azimuth. In particular, the astigmatism can be modeled as a linear combination of two radially symmetric sine functions. In this case, the first correction value corresponds to the coefficient in the first sine function, and the second correction value corresponds to the coefficient in the second sine function. In various implementations, the two sine functions are shifted by $\pi/2$. The first correction value and the second correction value thus constitute two correction values in two mutually perpendicular directions. For the purpose of correcting the astigmatism, an angle map of the region of the surface of the workpiece is generated. The angle map is determined on the basis of an image gradient. The image gradient can be determined on the basis of the image with an extended depth of field or the entire or part of the focal image stack of the region of the workpiece for each point. For this purpose, an image gradient is calculated for each point. The image gradient is determined from a change in brightness with respect to surrounding image points. The direction of the image gradient can be represented using an angle. Consequently, each point in the angle map is assigned an angle that indicates the direction of the image gradient. In other words, the angle map represents the corresponding angle of the image gradient for each point of the corrected image with an extended depth of field. On the basis of this angle, it is then possible for the purpose of correcting the depth value of the respective object point to calculate the proportion of the first and the second correction value. The proportion of the first correction value can be determined in particular by the product of the first correction value and the sine of the angle of the respective point. Accordingly, the proportion of the second correction value can also be determined by the product of the second correction value and the cosine of the angle of the respective point. The correction of the respective depth value can be effected in particular by subtraction of the sum of the proportions of the first and second correction values from the respective depth value. The first correction value and the second correction value can be in particular precalculated or predetermined. In this way it is possible to correct an astigmatism error in the depth values. On the basis of the corrected depth values of the object points, the image with an extended depth of field can then be corrected, in particular newly generated. By correcting the astigmatism error, the accuracy of the image with an extended depth of field is increased further. Computing the image having an extended depth of field on the basis of the corrected depth values corresponds to evaluating the image having an extended depth of field on the astigmatically compensated best setting plane according to Petzval.

In a further configuration, the optical sensor and the workpiece are movable relative to one another in the depth direction such that a distance in the depth direction between the workpiece and the optical sensor is variable, wherein the method furthermore comprises the following step:

varying the distance between the workpiece and the optical sensor, wherein, in the step of capturing, the plurality of images are captured while the distance between the workpiece and the optical sensor is varied, wherein the images each image the region of the surface of the workpiece at different, defined distances from the workpiece in the depth direction.

In this way, the focal plane position of the optical sensor is varied in a depth direction relative to the workpiece while the images that form the focal image stack are recorded.

In a further configuration, the measuring apparatus has a workpiece holder, wherein the workpiece is arranged on the workpiece holder for measuring purposes.

The workpiece holder can be in particular a workbench, a measuring table or an object stage. The workpiece holder is configured to hold the workpiece in a defined position during the measuring process. For this purpose, the workpiece holder can have a planar surface on the top side, for example, on which the workpiece can be arranged during the recording of the image with an extended depth of field.

In a further configuration, the measuring apparatus has a drive device, wherein the drive device moves the optical sensor relative to the workpiece holder in the depth direction and/or moves the workpiece holder relative to the optical sensor in the depth direction in order to vary the distance between the workpiece and the optical sensor.

In other words, the drive device is configured to move the workpiece holder and the optical sensor relative to one another in order to vary the distance between the workpiece and the optical sensor. For this purpose, the drive device can either move the workpiece holder in the depth direction or move the optical sensor in the depth direction or move the workpiece holder and the optical sensor in the depth direction.

In a further configuration, the distance between the workpiece and the optical sensor is varied in discrete steps.

In this case, the distance can be increased or decreased step by step. By way of example, the distance can be varied in 50 μm steps.

In a further configuration, the measuring apparatus has an illumination device, wherein the method furthermore comprises the following step:

illuminating the workpiece using the illumination device during the process of capturing the images of the focal image stack.

The illumination device is used to illuminate at least the region of the surface of the workpiece. The reflected light is then used to generate an image in the optical sensor. In this way, the region of the workpiece can be illuminated uniformly and the depth values of the surface region can be determined with substantially the same accuracy. The illumination can be in the form of, for example, coaxial illumination, ring illumination, dark field illumination, diffuse illumination, or point-source illumination. The illumination device can be in particular a monochromatic light source, for example a monochromatic laser. A monochromatic light source has the advantage that no chromatic aberrations can occur.

In a further configuration, the method furthermore comprises the following step:

determining the at least one distortion value for each image point of the image with an extended depth of field, wherein initially an image with an extended depth of field of a calibration object, in particular of a point grid, is recorded, wherein the at least one distortion value is determined on the basis of a deviation of the image with an extended depth of field with respect to a known surface profile of the calibration object.

In this way, the distortion values for the image points of the image with an extended depth of field are determined in an initial step. "Initial" means that the step of determining the distortion values takes place before the step of capturing the plurality of images of the region of the surface of the workpiece. In order to determine the distortion values, an image with an extended depth of field of a calibration object is recorded first. The calibration object can also be referred to as a calibration mask. In various implementations, the calibration object has round structures. In particular, the calibration object can be a point grid or a perforated mask. A point grid is a regular arrangement of points. In particular, a point grid is a geometric structure in which points are arranged at identical distances from one another in two or three spatial directions. In the case of two spatial directions, the points are perpendicular to one another. In the case of three spatial directions, the points are arranged pair-wise at an angle of 60° with respect to one another. Each point of the point grid has a spatial extent and, in various implementations, is circular. Each point of the point grid can be imaged by a plurality of image points of a captured image. Each point has a planar surface. The surface profile of the point grid is thus already known in advance. In particular, the point grid can be arranged on the workpiece holder such that the points of the point grid lie in a horizontal plane. Generating the image with an extended depth of field of the calibration object, in particular of the point grid, is effected in accordance with the method for generating a corrected image with an extended depth of field, but without the distortion error being corrected. The recorded image of the calibration object is then analyzed with the aid of distortion routines in order to determine the distortion, in particular the distortion values. In particular, the distortion values can be determined by comparing the recorded image of the calibration object and/or the associated determined depth values with the known surface profile of the calibration object. Each distortion value determined can be stored in particular in an electronic storage unit. The measuring apparatus can have this storage unit. In particular, the distortion values can be stored in the form of a table ("look-up table"). After the distortion values have been determined, the corrected image with an extended depth of field of the workpiece can then be recorded. In this case, the depth values of the object points can be corrected using the determined distortion values. In this way, the distortion values of the image points can be easily determined and corrected.

In a further configuration, the method furthermore comprises the following step:

determining the first and second correction values for each image point of the image with an extended depth of field, wherein initially an image with an extended depth of field of a calibration object, in particular of a point grid, is recorded, wherein the respective correction value is determined on the basis of deviations of the image with an extended depth of field or the determined depth values of the object points of the calibration object with respect to a known surface profile of the calibration object.

For the purpose of determining the first correction value and the second correction value, each point of the point grid is considered individually. The first and second correction values can then be determined on the basis of a deviation of the calculated depth profile with respect to the actual depth profile of the respective point, which profile is a planar surface. In order to determine the correction values, an image with an extended depth of field of a point grid is thus recorded in advance, i.e., initially. Generating the image with an extended depth of field of the calibration object, in particular of the point grid, is effected in accordance with the method for generating a corrected image with an extended depth of field, but without the step of correcting the one or more imaging errors. Each correction value determined can be stored in particular in an electronic storage unit. The measuring apparatus can have this storage unit. After the desired correction values have been determined, the corrected image with an extended depth of field of the workpiece can then be recorded. In this case, the depth values of the object points can be corrected using the correction values determined. In this way, the correction values can be easily determined and corrected.

In a further configuration, determining the first and second correction values comprises the following steps:

determining the first correction value and the second correction value for each point of the point grid on the basis of a cost function between an astigmatism model and the depth values of the respective point; and interpolating the first and second correction values on the basis of the first and second correction values of each point of the point grid.

As already described above, each point of the point grid is imaged using a plurality of image points of a captured image. The depth values of each individual point can be segmented after the corrected image with an extended depth of field of the point grid has been generated. In this case, the points of the corrected image with an extended depth of field which are respectively assigned to, and image, a point of the point grid are first determined. As already described above, the astigmatism model is an adaptation of the depth value deviation represented by way of the circle azimuth. The adapted fit function, described by the fit parameters, corresponds to the first correction value and to the second correction value of the respective point of the point grid. In particular, the astigmatism model can be a linear combination of two radially symmetric sine functions. The cost function is then minimized according to the coefficients of the sine functions. The coefficients of the sine functions correspond to the first correction value and to the second correction value of the respective point of the point grid. Proceeding from the first and second correction values determined for each point of the point grid, the first and second correction values for each point of the corrected image with an extended depth of field are determined by interpolation on the basis of the first and second correction values of each point of the point grid.

In a further configuration, the method furthermore comprises the following step:

outputting the image with an extended depth of field using an output device.

The output device can have a display, for example, wherein the corrected image with an extended depth of field can be displayed on the display. Moreover, the output device may be designed to output the corrected image with an extended depth of field to an electronic storage device, to a further apparatus, or to an external display. The electronic storage device can be, for example, a storage medium, in particular a hard disk, a flash memory, or a cloud. By way of example, the further apparatus can use the corrected image with an extended depth of field to carry out further processes. By way of example, the external display can be designed to display the corrected image with an extended depth of field.

In a further configuration, the measuring apparatus furthermore has a drive device, wherein the drive device is configured to move the optical sensor and the workpiece holder relative to one another in the depth direction in order to vary a distance between the workpiece and the optical sensor.

The drive device can thus be used to set the focal plane position of the optical sensor in the depth direction relative to the workpiece.

In a further configuration, the control device is furthermore designed to carry out the following steps, in particular before the step of generating the corrected image with an extended depth of field:

controlling the optical sensor such that a plurality of images of a region of the surface of the workpiece are captured using the optical sensor, wherein the images each image the region of the surface of the workpiece with defined focal plane positions that are different in the depth direction, and wherein the captured images form a focal image stack.

The control device thus controls the capturing of the images of the focal image stack.

In a further configuration, the control device is furthermore designed to carry out the following steps, in particular before the step of generating the corrected image with an extended depth of field:

controlling the drive device in such a way that a distance between the workpiece and the optical sensor is varied, wherein the optical sensor is controlled in such a way that the plurality of images are captured while the distance between the workpiece and the optical sensor is varied, wherein the images each image the region of the surface of the workpiece at different, defined distances from the workpiece in the depth direction.

In this way, the focal plane position of the optical sensor is varied in the depth direction relative to the workpiece while the images that form the focal image stack are recorded.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

Various implementations of the present disclosure are illustrated in the drawings and are explained in greater detail in the following description.

FIG. 6A shows an example view of a focal image stack.

FIG. 6B shows a view of a diagram for illustrating determined sharpness values along the depth direction.

FIG. 6C shows a view of a diagram for illustrating the fitting of a function to determined sharpness values along the depth direction.

FIG. 6D shows an example view of an image with an extended depth of field.

DETAILED DESCRIPTION

Figure 1:
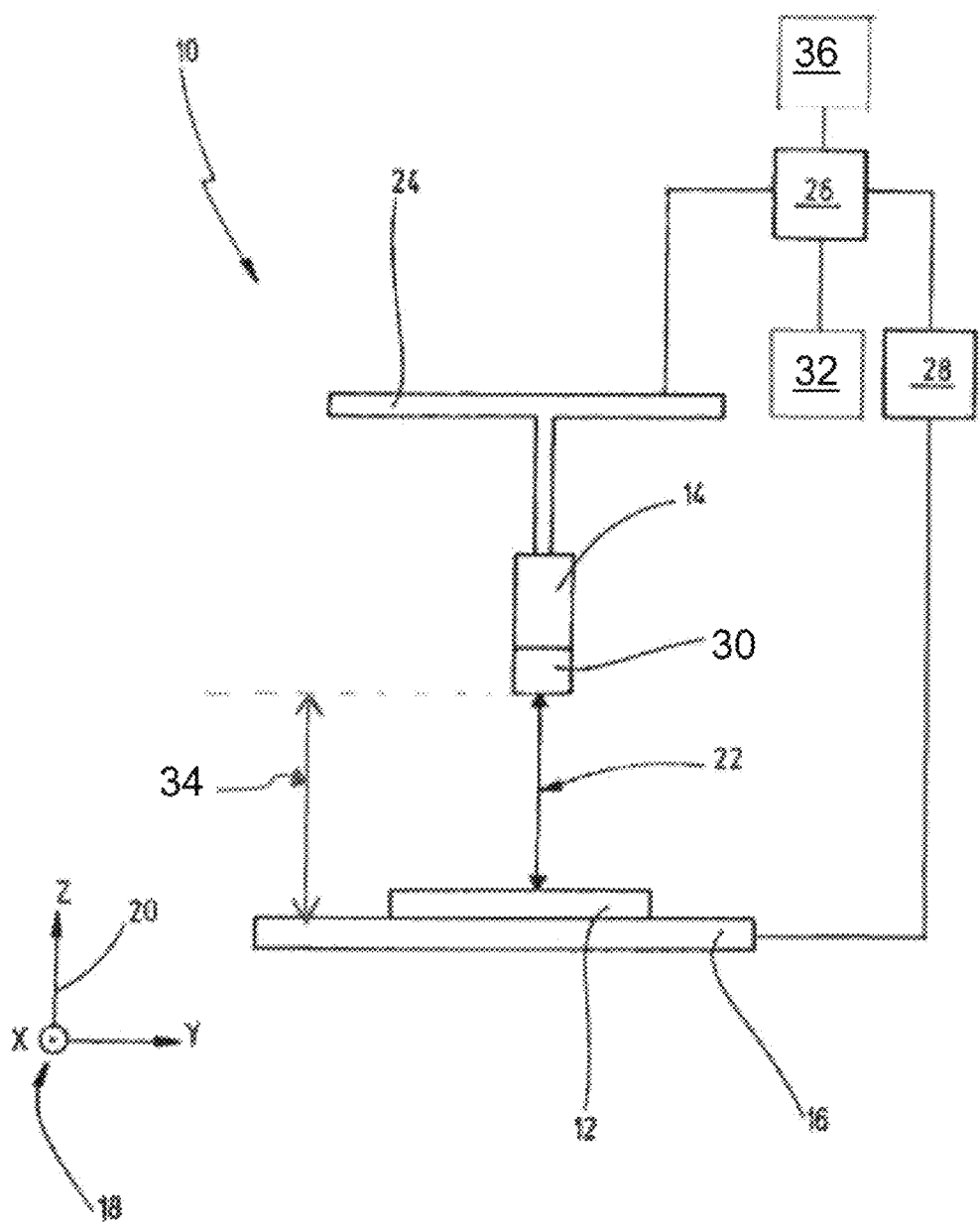
FIG. 1 shows a schematic view of the measuring apparatus.

FIG. 1 shows a measuring apparatus 10. The measuring apparatus can be a microscope or a coordinate measuring machine. The measuring apparatus 10 serves for measuring a workpiece 12. For this purpose, the measuring apparatus has an optical sensor 14. In addition to the optical sensor 14, further sensors can of course also be provided, for example tactile sensors, but they are not illustrated in the present schematic view.

The optical sensor 14 can have an optical system 30 and an image sensor. The optical system 30 images a region of the surface of the workpiece 12 onto the image sensor. The optical sensor 14 can capture an image of the region of the surface of the workpiece 12 using the image sensor.

Moreover, the measuring apparatus 10 may comprise an illumination device 32. The illumination device is designed to illuminate at least the region of the surface of the workpiece 12.

The workpiece 12 to be measured is arranged on a workpiece holder 16. The workpiece holder 16 may be a measuring table, a workbench or an object stage. In the illustrated view, the workpiece holder 16 is oriented in an X-Y-plane of a coordinate system 18. A Z-direction 20 extends perpendicularly to the workpiece holder 16. The Z-direction 20 is a depth direction. A distance between the optical sensor 14 and the workpiece 12 in the depth direction 20 is denoted by a reference sign 22. A distance between the optical sensor 14 and the workpiece holder 16 in the depth direction 20 is denoted by a reference sign 34. The optical sensor 14 and the workpiece holder 16 are movable relative to one another. The distance 34 can be varied in this way. Since the workpiece 12 is arranged on the workpiece holder 16, the distance 22 changes in accordance with the distance 34. In principle, for this purpose provision can be made for the workpiece holder 16 to be movable in the depth direction 20 and/or for the optical sensor 14 to be movable, for example by using a suitable mechanism 24, in the depth direction 20.

The measuring apparatus 10 can furthermore have a drive device 28. The drive device 28 is configured to move the workpiece holder 16 and the optical sensor 14 relative to one another in the depth direction 20. In various implementations, the drive device 28 is configured to move the workpiece holder 16 relative to the optical sensor 14 in the depth direction 20. Alternatively, the drive device 28 can also be configured to move the optical sensor 14 relative to the workpiece holder 16 in the depth direction 20. It goes without saying that the drive device 28 can also be configured to move both the optical sensor 14 and the workpiece holder 16 in the depth direction 20.

The apparatus 10 furthermore has a control device 26. The control device 26 is configured to control the individual components of the measuring apparatus and to process data. By way of example, the control device 26 may comprise various subunits to this end, which each implement component control and/or data processing. By way of example, the control device 26 may comprise a closed-loop control unit which controls the drive device 28, the optical sensor 14 and/or the illumination device 32. Moreover, the control device 26 may comprise a data processing unit which is configured to implement the evaluation of images captured by the optical sensor. The data processing unit can generate an image with an extended depth of field of a region of the surface of the workpiece 12 for example on the basis of a plurality of images that form a focal image stack.

The control device 26 can be connected to or have a non-volatile data memory in which a computer program is stored. In some example embodiments, the control device 26 is a multipurpose computer, for instance a commercially available personal computer running Windows®, Linux or MacOS, and the computer program from the memory comprises program code designed and configured to implement embodiments of the novel method in combination with the optical sensor 14 and the drive device 28. In an alternative example embodiment, the control device 26 is a logic circuit such as, for instance, a field programmable gate array (FPGA), an application-specific integrated circuit (ASIC), a microcontroller or any other appropriate programmable electrical circuit. Therein it is possible to implement the embodiments of the novel method, in particular control and determination steps, with the logic circuit, such that the logic circuit is designed and configured for implementing embodiments of the novel method in combination with the optical sensor 14 and the drive device 28. For implementing embodiments of the novel method in the logic circuit, it is possible to use any appropriate programming language or hardware description language such as, for instance, C, VHDL and the like.

Furthermore, the measuring apparatus 10 can have an output device 36. The output device 36 is configured to output the image with an extended depth of field. By way of example, the output device 36 may comprise a display, on which the image with an extended depth of field can be displayed. Alternatively or in addition, the output device 36 may be designed to output the image with an extended depth of field to an electronic storage device, to a further apparatus, or to an external display.

Furthermore, the measuring apparatus 10 can also have an input apparatus that allows a user to input, for example, the number and distances or step size of the images to be captured into the coordinate measuring machine 10 or to manually move the optical sensor 14.

Before a region of a surface of the workpiece 12 is recorded, provision can be made for a user to input the number of images to be captured and also the step size or distances 22 with which the images are intended to be captured. Alternatively, the number of images to be captured and also the step size or distances 22 with which the images are intended to be captured can be predefined or fixedly specified. For the purpose of recording the region of the surface of the workpiece 12, the control device 26 then controls the drive device 28 in such a way that the distance 22 between the workpiece 12 and the optical sensor 14 is varied in accordance with the presetting. At the same time the control device 26 controls the optical sensor 14 in such a way that a plurality of images of the region of the surface of the workpiece 12 are captured in accordance with the presetting while the distance 22 is varied. In this case, each image is captured at a different distance 22 from the workpiece 12. The plurality of images then forms a focal image stack. The focal image stack is then evaluated by the control device 26 in order to generate the image with an extended depth of field of the region of the surface of the workpiece 12.

Figure 2:
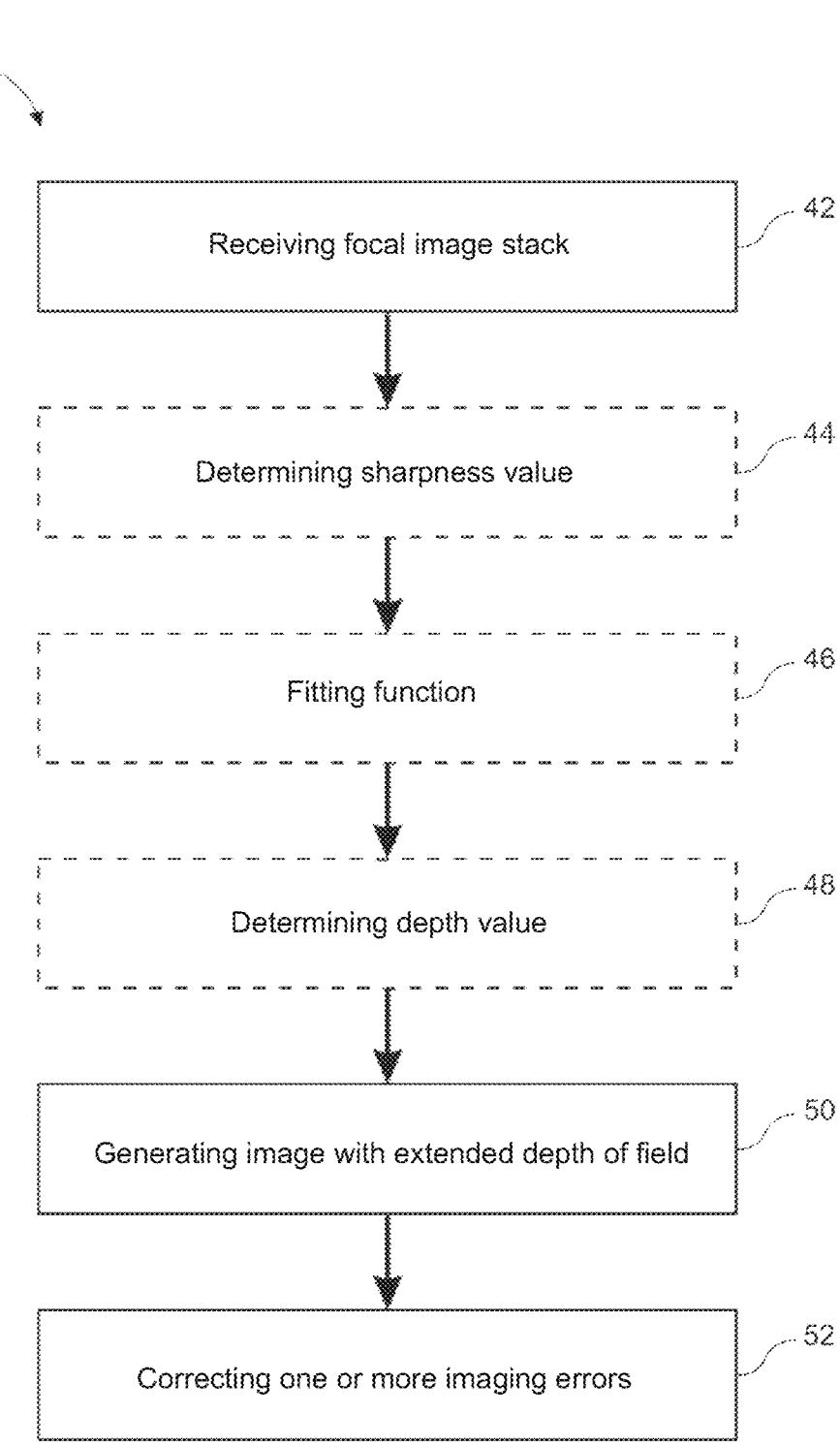
FIG. 2 shows a schematic view of a method for generating a corrected image with an extended depth of field.

FIG. 2 shows a computer-implemented method 40 for generating a corrected image with an extended depth of field of a region of a surface of the workpiece 12. The method can be carried out using the control device 26, for example.

In a first step 42 of the method 40, a focal image stack is received. The focal image stack has a plurality of images of the workpiece 12, wherein the images image the region of the surface of the workpiece 12 with defined focal plane positions that are different in a depth direction, wherein a focal plane position is assigned to each image of the focal image stack. Each image has image points. The image points of the images are respectively assigned to a corresponding object point on the surface of the workpiece 12.

In various implementations, the images each image the region of the surface of the workpiece 12 at different, defined distances 22 from the workpiece 12 in the depth direction 20. In this case, a distance 22 is assigned to each image of the focal image stack. Since the images are captured at different distances 22 from the workpiece 12 in the depth direction 20, a depth value in the depth direction 20 is assigned to each image of the focal image stack. In particular, the depth values of the images succeed one another in discrete steps.

Alternatively, the images each image the region of the surface of the workpiece 12 with different, defined focus positions, i.e., different focal image planes. In this case, each focus position or setting of the focal distance of the objective of the optical sensor can be assigned a depth value in the depth direction 20 that corresponds to the distance with respect to the focal plane in the respective focus position or setting. The distance between the optical sensor 14 and the workpiece 12 can remain constant in this case.

FIG. 6A shows by way of example four images of a focal image stack, wherein different depth values (position in the z-direction) are assigned to the images.

In a further optional step 44 of the method 40, a sharpness value of each image point of each image of the focal image stack is determined. The sharpness values of the image points are determined on the basis of a sharpness of each image point. For this purpose, for each image point a gradient of the brightness, of a grayscale value or of a contrast value with respect to the surrounding image points of the corresponding image is determined. In this way, a sharpness value is assigned to each image point of each image from the focal image stack. Since each image is assigned a depth value in the depth direction 20, accordingly each image point of the respective image is also assigned the same depth value. In other words, a depth value and a sharpness value are assigned to each image point.

As was explained in the introductory part, each object point is assigned from each image one image point. FIG. 6B shows the sharpness values f(z) of the image points which are assigned to the same object point. Since the image points come from different images of the focal image stack, different depth values are assigned to the image points (and thus also to their sharpness values). FIG. 6B shows the distribution of these sharpness values along the depth direction (z-direction).

A further optional step 46 of the method 40 involves fitting a respective function along the depth direction 20 to the sharpness values of those image points of the images which are assigned to the same object point. The function describes an assignment in which a corresponding sharpness value is assigned to each depth value in the depth direction. In various implementations, the function is a Gaussian function. It is also possible to use other functions such as, for example, a parabolic function for fitting. In various implementations, the function is axially symmetric with respect to a maximum. A maximum and a residual of the fitted function can be determined.

The fitting of a function along the depth direction 20 to the sharpness values of those image points of the images which are assigned to the same object point is shown in FIG. 6C. FIG. 6C shows in particular the diagram of FIG. 6B, wherein in addition a function along the depth direction is adapted to the sharpness values. FIG. 6D shows by way of example an image with an extended depth of field which is generated on the basis of FIGS. 6A to 6C.

A further optional step 48 of the method 40 involves determining the depth value of each object point on the surface of the workpiece 12 in the depth direction 20 on the basis of the determined sharpness values.

For example, the depth value of each object point can be determined on the basis of the maximum of the respectively fitted function. The maximum has a position, i.e., a depth value, in the depth direction, wherein this depth value is determined as depth value for the object point.

Alternatively, the depth value of each object point can be determined on the basis of the maximum and the residual of the respectively fitted function. The residual is a measure of how much the function deviates from the ascertained sharpness values. The residual thus indicates the quality of the fit. For each object point for which the residual of the corresponding, fitted function is greater than a defined threshold value, the depth value is determined on the basis of a maximum of the corresponding, fitted function. For each object point for which the residual of the corresponding, fitted function is equal to or less than the defined threshold value, the depth value is determined by interpolation of the depth values of at least two neighboring object points. In particular, it is possible for this purpose to first determine the depth value for all object points on the basis of the maxima of the fitted functions, wherein for the object points for which the residual of the corresponding, fitted function is equal to or less than the defined threshold value, the depth values are discarded again and determined by interpolation of the depth values of neighboring object points.

The determined depth values of the object points form a depth map of the region of the surface of the workpiece 12.

A further step 50 of the method 40 involves generating an image with an extended depth of field of the region of the surface of the workpiece 12 on the basis of the determined depth values of each object point and the images of the focal image stack. In other words, the image with an extended depth of field is generated on the basis of the depth map and the focal image stack. FIG. 6D shows by way of example the image with an extended depth of field which is generated on the basis of FIGS. 6A to 6C.

In a further, optional step 52 of the method 40, one or more imaging errors are corrected in the image with an extended depth of field. The imaging errors to be corrected include at least one distortion error. In various implementations, the imaging errors to be corrected also include an astigmatism error. In order to correct the imaging errors, the positions of the image points perpendicular to the depth direction and/or the depth values of the object points, i.e., the depth map, can be corrected. When the depth values of the object points are corrected, the image with an extended depth of field is then corrected or newly generated on the basis of the corrected depth values and the focal image stack. In various implementations, the distortion error is corrected after the astigmatism error has been corrected. In other words, the astigmatism error can be corrected before the distortion error.

For the purposes of correcting the distortion error, each point of the image with an extended depth of field is assigned at least one distortion value, wherein a position of each point of the image with an extended depth of field is corrected perpendicular to the depth direction on the basis of the at least one distortion value. The distortion value indicates how the point of the image with an extended depth of field should be shifted/undistorted in the x- and/or y-direction or in the radial and/or tangential direction in order to correct the distortion of the point. In particular, each point of the image with an extended depth of field can be assigned a first distortion value and a second distortion value, wherein the position of each point of the image with an extended depth of field is corrected in a first direction on the basis of the first distortion value and is corrected in a second direction on the basis of the second distortion value. The first and second directions can here be, for example, the x- and y-directions or the radial and tangential directions.

The correction of the astigmatism error is dependent on the edge direction, or the astigmatism error is dependent on the angle. Therefore, an angle map is first determined for the region of the surface of the workpiece 12. The angle map assigns each point of the image with an extended depth of field an angle $\theta$. The angle $\theta$ is the result of an image gradient with respect to surrounding image points. A first correction value and a second correction value are assigned to each point of the image with an extended depth of field, wherein the depth value of each point of the image with an extended depth of field is corrected on the basis of the first correction value, the second correction value and the angle map.

Generally, the astigmatism can be described for each corrected image with an extended depth of field by way of a function that is dependent on the angle $\theta$, in particular a model or fit function, and has at least two parameters. In a function having two parameters, these parameters correspond to the first and second correction values. In particular, the astigmatism can be modeled as a linear combination of two radially symmetric sine functions. In this case, the first correction value corresponds to the coefficient in the first sine function, and the second correction value corresponds to the coefficient of the second sine function. For example, the astigmatism can be modeled with the equation $\alpha \sin \theta + \beta \cos \theta$ (first-order expansion) or $\alpha \sin 2\theta + \beta \cos 2\theta$ (second-order expansion).

Since the angle $\theta$ is determined from the angle map for each point of the corrected image with an extended depth of field, it is thus possible for each point of the corrected image with an extended depth of field to calculate an effective correction value using the equation $\alpha \sin \theta + \beta \cos \theta$ or $\alpha \sin 2\theta + \beta \cos 2\theta$. The correction of the respective depth value is then effected by subtraction of the corresponding effective correction value from the respective depth value. It is then possible with the aid of the corrected depth values (depth map) to generate a corrected image with an extended depth of field in which the astigmatic imaging error is corrected.

The correction values and distortion values for correcting the respective imaging errors can be determined in advance as described below in FIGS. 4 and 5.

Figure 3:
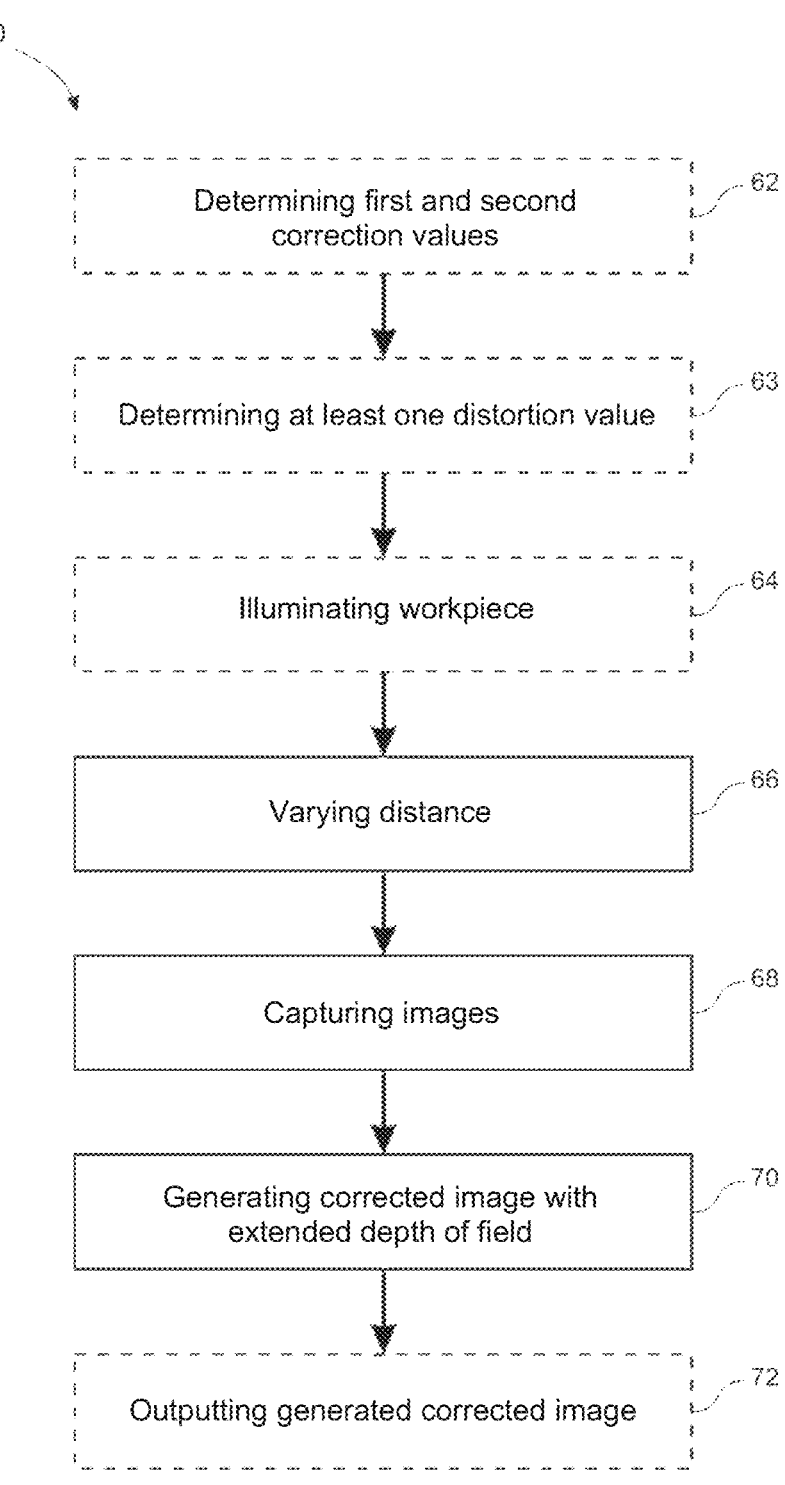
FIG. 3 shows a schematic view of a method for recording a corrected image with an extended depth of field.

FIG. 3 shows a method 60 for recording a corrected image with an extended depth of field of a region of a surface of the workpiece 12 with the optical sensor 14 of the measuring apparatus 10. The workpiece 12 is arranged on the workpiece holder 16 for measuring purposes. The optical sensor 14 can then capture a region of the surface of the workpiece 12. The optical sensor 14 and the workpiece 12 are movable relative to one another in a depth direction 20 such that the distance 22 in the depth direction 20 between the workpiece 12 and the optical sensor 14 is variable.

In a step 66 of the method 60, the distance 22 between workpiece and the optical sensor is varied. For this purpose, the drive device can move the optical sensor 14 relative to the workpiece holder 16 in the depth direction 20 and/or move the workpiece holder 16 relative to the optical sensor 14 in the depth direction 20 in order to vary the distance 22 between the workpiece 16 and the optical sensor 14. In particular, the distance 22 can be varied in discrete steps, for example in steps of 50 μm.

A further step 68 of the method 60 involves capturing a plurality of images of a region of the surface of the workpiece using the optical sensor while the distance 22 between the workpiece and the optical sensor is varied, wherein the images each image the region of the surface of the workpiece 12 at different, defined distances 22 from the workpiece 12 in the depth direction 20, wherein each image point of each image is assigned to a corresponding object point on the surface of the workpiece 12, and wherein the captured images form a focal image stack.

In a further step 70 of the method 60, the corrected image with an extended depth of field of the region of the surface of the workpiece 12 is generated using the method from FIG. 2.

In a further optional step 72 of the method 60, the generated corrected image with an extended depth of field is output using the output device 36.

In a further optional step 64 of the method 60, the workpiece 12 is illuminated using the illumination device 32 during the process of capturing the images of the focal image stack.

Figure 15A:
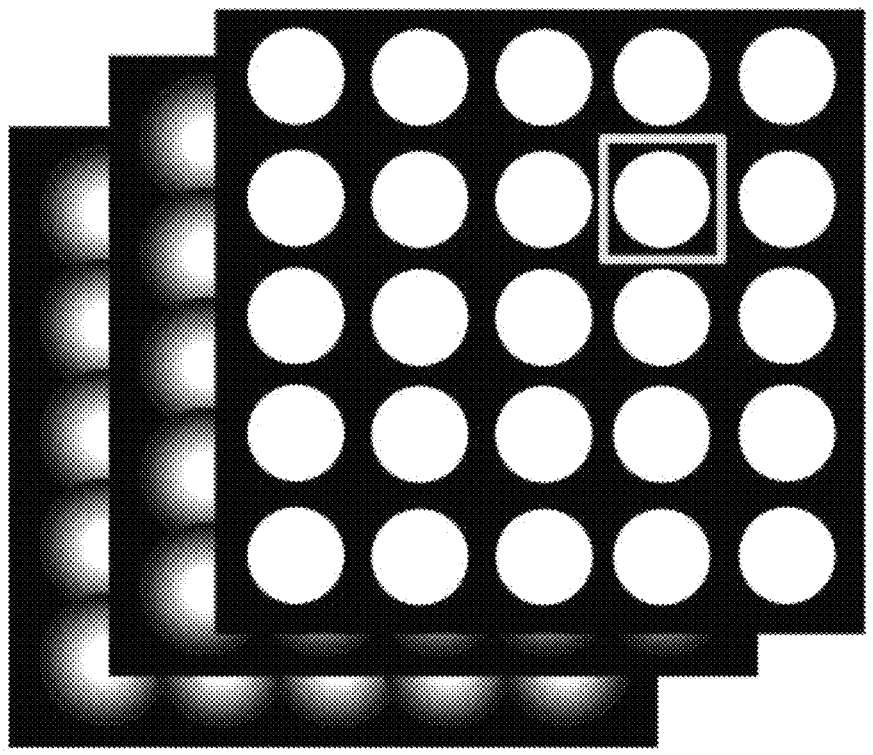
FIG. 15A shows a view of an illustration of a point grid.

In a further optional step 62 of the method 60, the first and second correction values for each object point/image point of the image with an extended depth of field are determined. In other words, the correction values for correcting the astigmatism error are determined in this case. For this purpose an image with an extended depth of field of a calibration object, in particular a point grid, is recorded initially, i.e., before the recording of the corrected image with an extended depth of field of the region of the surface of the workpiece 12, in particular before steps 64 to 72. The image with an extended depth of field of the calibration object is generated according to steps 64 to 70 with a calibration object as workpiece, with no correction of imaging errors being performed during the process of generating this image. FIG. 15A shows an example illustration of a calibration object in the form of a point grid. Since the surface profile of the calibration object is known, the correction values to be determined can then be determined on the basis of deviations of the image with an extended depth of field of the calibration object with respect to the known surface profile of the calibration object.

In a further optional step 63 of the method 60, at least one distortion value for each point of the image with an extended depth of field is determined, such as after step 62. For this purpose an image with an extended depth of field of a calibration object, in particular a point grid, is recorded initially, i.e., before the recording of the corrected image with an extended depth of field of the region of the surface of the workpiece 12, in particular before steps 64 to 72. The same calibration object can be used in steps 62 and 63. In particular, the image of the calibration object, in particular of the point grid, recorded in step 62 can be used in step 63. Since the surface profile of the calibration object is known, the at least one distortion value of each point of the image with an extended depth of field can then be determined on the basis of a deviation of the image with an extended depth of field with respect to a known surface profile of the calibration object. In various implementations, an offset in the x- and/or y-direction or in the radial and/or tangential direction is ascertained for each point of the image with an extended depth of field, wherein the correction value indicates the shift in the corresponding direction. In particular, if each point of the image with an extended depth of field is assigned in each case a first and a second distortion value, the first distortion value indicates the offset in the first direction (for example x- or radial direction) and the second distortion value indicates the offset in the second direction (for example y- or tangential direction).

Steps 62 and 63 can thus be understood as calibration steps in which systematic measurement errors of the optical sensor are determined and corresponding correction values are ascertained. For calibration purposes, in particular a point grid can be used.

Figure 4:
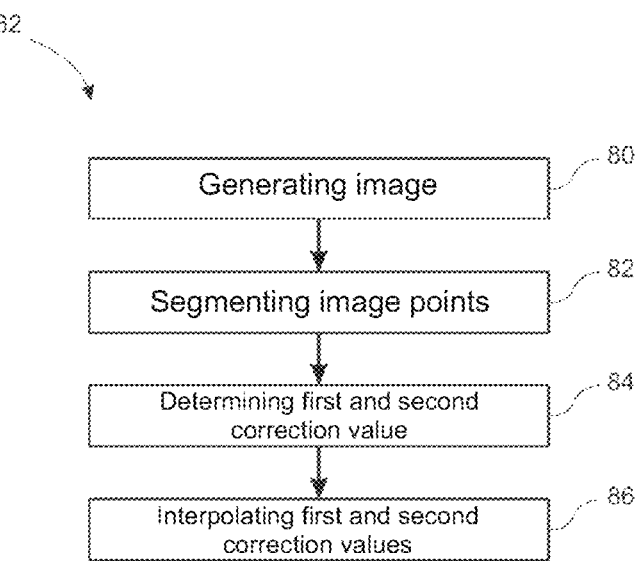
FIG. 4 shows a schematic view of method steps for determining correction values.

FIG. 4 shows an example of method steps that can be used to determine the correction values in step 62 of the method 60.

In a first step 80, an image with an extended depth of field of a point grid is generated as calibration object. The image with an extended depth of field of the point grid is generated, in accordance with steps 64 to 70, with a point grid as workpiece 12. An example illustration of a point grid as calibration object is illustrated in FIG. 15A.

In a further step 82, those image points of the image with an extended depth of field of the point grid that image each individual point of the point grid are segmented. In this way, the image points of the image with an extended depth of field of the point grid which are respectively assigned to, and image, a point of the point grid are determined. For segmentation purposes it is possible to use a circular Hough transform, which allows circles to be recognized. The circular Hough transform can be applied to the image with an extended depth of field of the point grid, for example, in order to detect the position of the individual points of the point grid. In particular, the circular Hough transform can be used to determine for each point of the point grid the positions of the image points (edge points) that are arranged on the edge of each point grid circle. These edge points are then the image points that are assigned to the respective point of the point grid.

A further step 84 involves determining for each point of the point grid a first correction value and a second correction value on the basis of a cost function L between an astigmatism model and the corrected depth values of the respective point of the point grid. A linear combination of two radially symmetric sine functions can be used as the astigmatism model. The astigmatism model can be defined for example by the formula $\alpha \sin \theta + \beta \cos \theta$. In this case, $\alpha$ and $\beta$ are the coefficients of the sine functions and $\theta$ is an angle in the X-Y-plane around the center point of the respective point of the point grid. The cost function L is defined in accordance with the following equation: $L(\alpha,\beta)=\Sigma|f(r,\theta)-(\alpha \sin\theta+\beta \cos\theta)|^2$ In the cost function in this case a sum is formed over those points of the corrected image with an extended depth of field which are assigned to or image and/or represent the corresponding point of the point grid. The positions of these points in the X-Y-plane can be indicated in polar coordinates r and $\theta$ in relation to the center point of the respective point of the point grid. $f(r,\theta)$ indicates the deviation of the depth value of these points of the corrected image with an extended depth of field with respect to the averaged depth value of the point of the point grid. The cost function is then minimized according to the coefficients of the sine functions. The first and second correction values of the point of the point grid can then be determined on the basis of the minimized coefficients $\alpha$ and $\beta$. In particular, the first and second correction values of the point of the point grid correspond to the minimized coefficients.

In a further step 86, the first and second correction values of the image points of the image with an extended depth of field, in particular the first and second correction values for the depth values of the object points, are interpolated over the entire region on the basis of the first and second correction values of each point of the point grid. In this way, it is possible to assign a first and second correction value to each image point of the image with an extended depth of field, in particular each object point.

Figure 5:
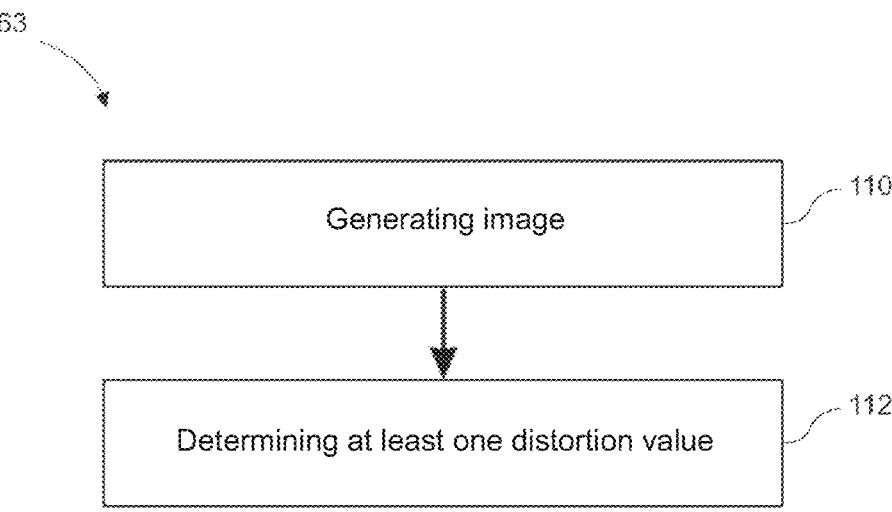
FIG. 5 shows a schematic view of method steps for determining distortion values.
Figure 7:
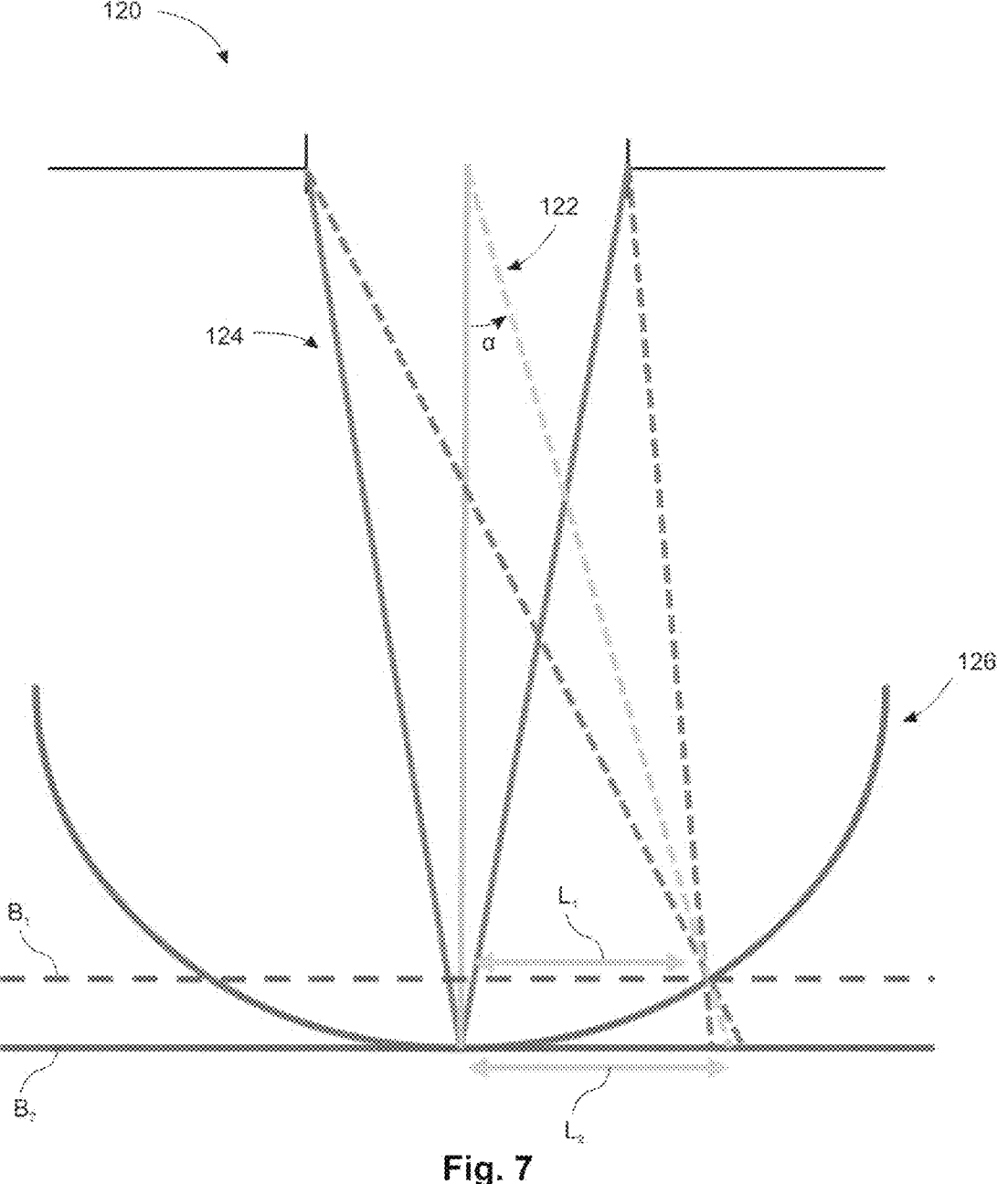
FIG. 7 shows an example view for illustrating imaging onto a curved image plane under the influence of image field curvature.
Figure 8:
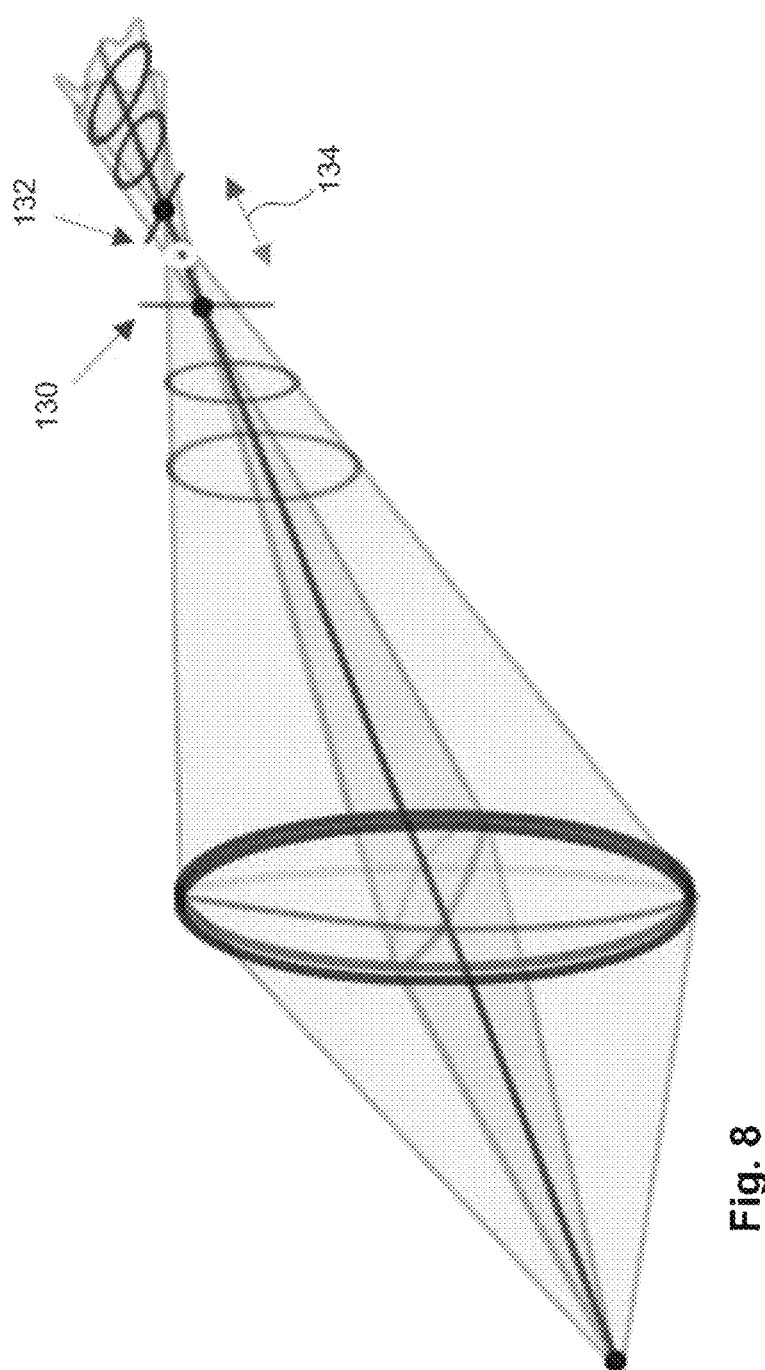
FIG. 8 shows an example view for illustrating astigmatism of a lens.
Figure 9:
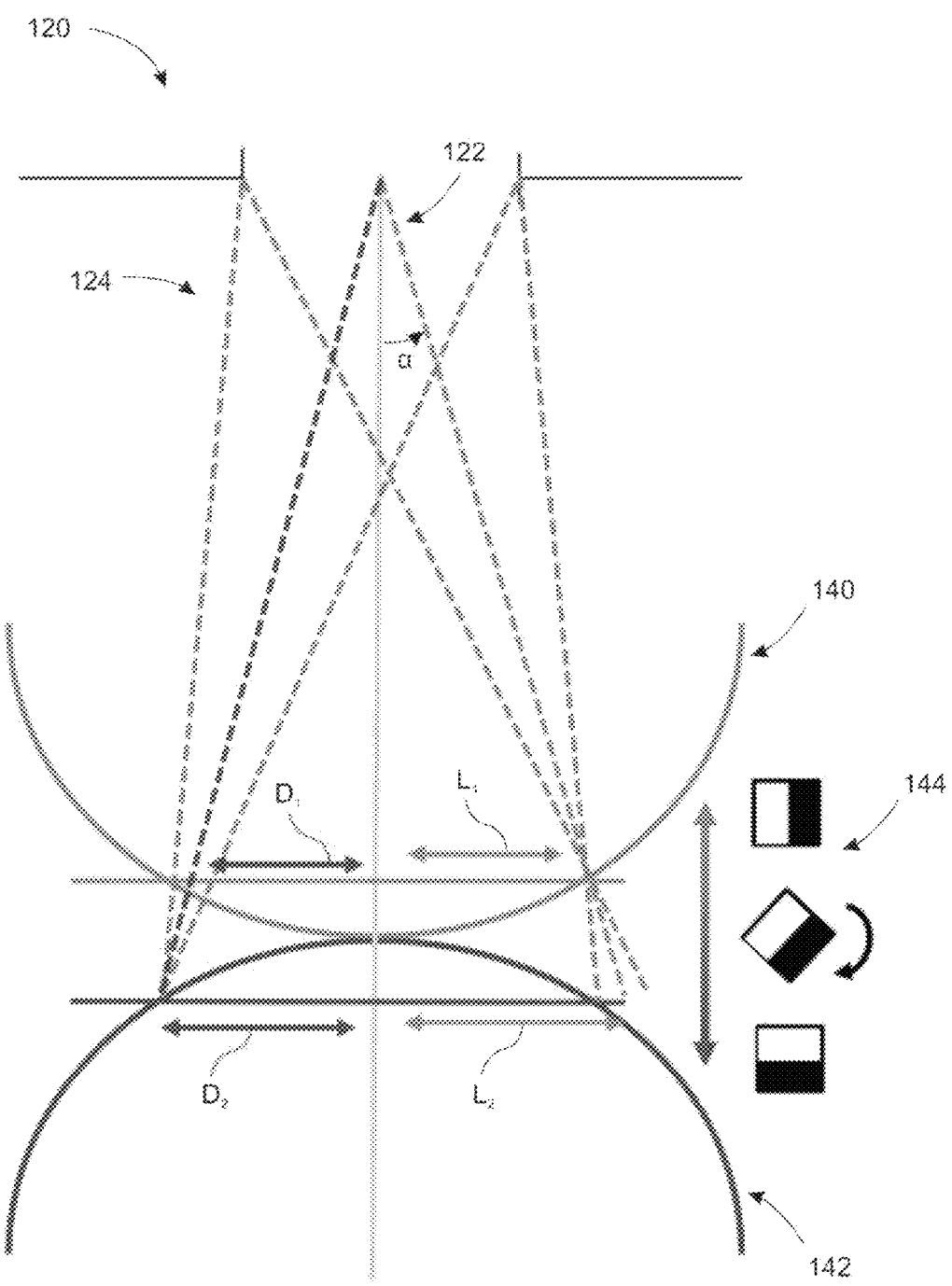
FIG. 9 shows an example view for illustrating imaging onto curved image planes under the influence of astigmatism.
Figure 10:
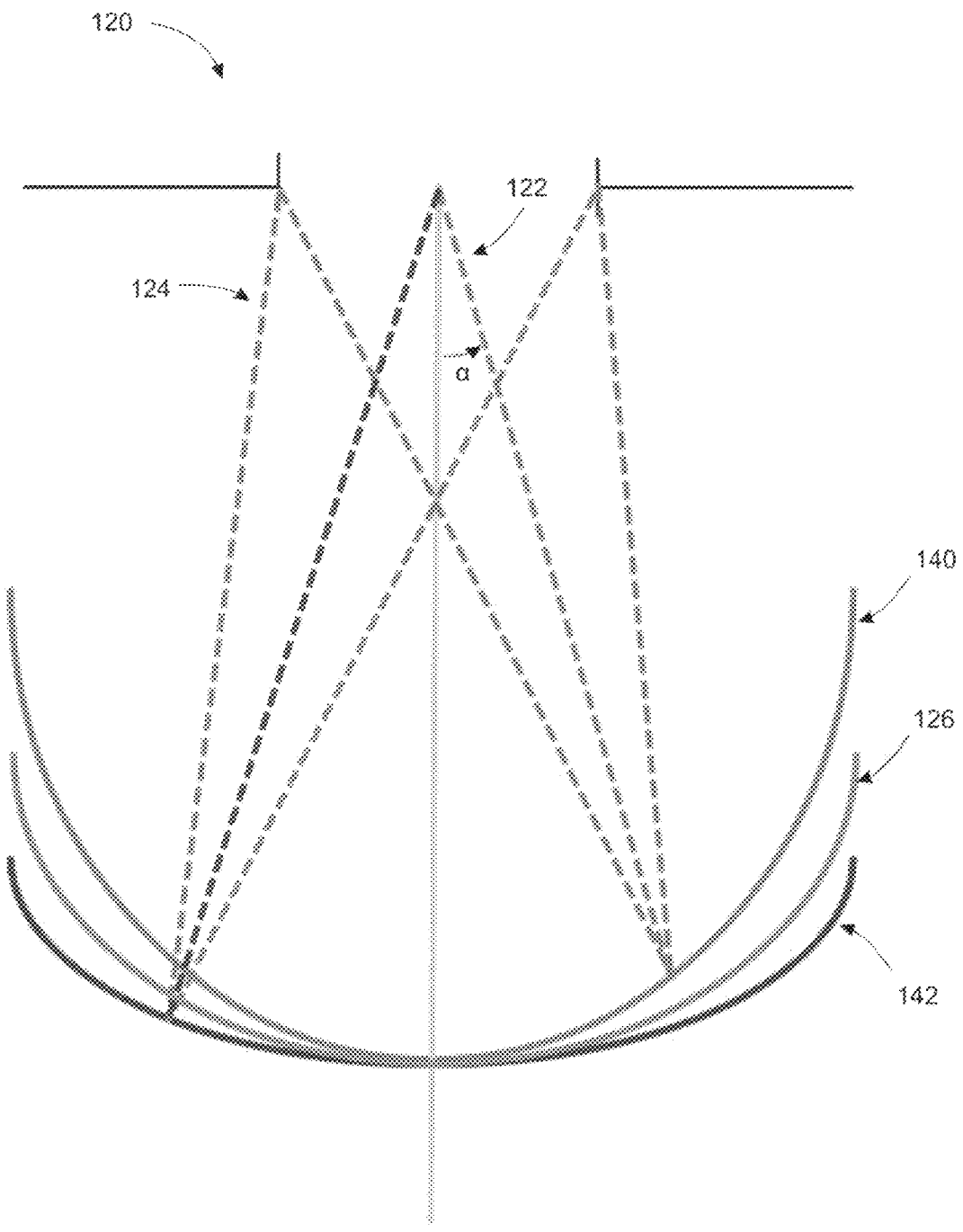
FIG. 10 shows an example view for illustrating imaging onto curved image planes under the influence of image field curvature and astigmatism.
Figure 11:
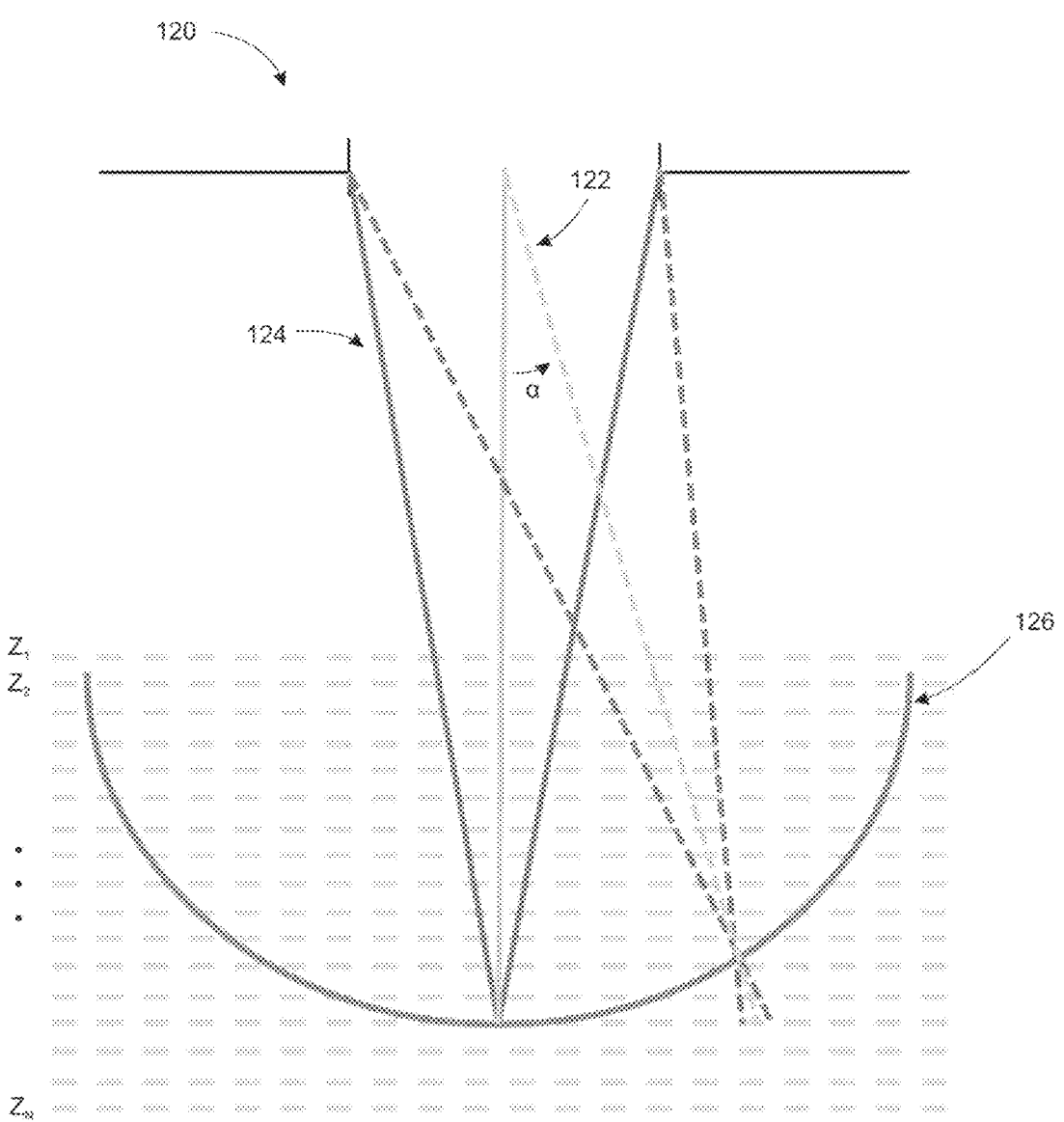
FIG. 11 shows an example view for illustrating different image planes during the recording of an image with an extended depth of field under the influence of image field curvature.
Figure 12:
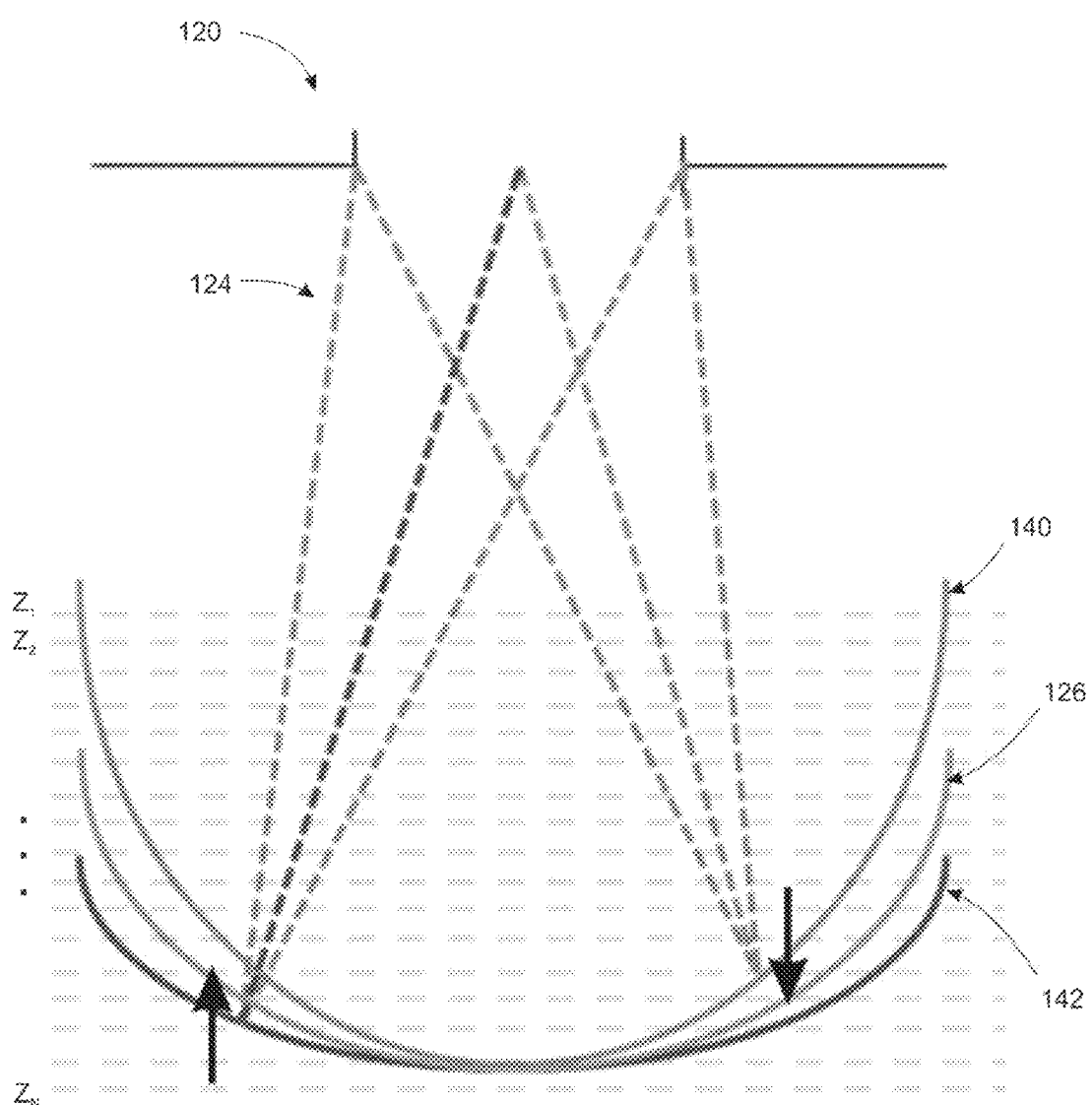
FIG. 12 shows an example view for illustrating different image planes during the recording of an image with an extended depth of field under the influence of image field curvature and astigmatism.

FIG. 5 shows method steps used to determine the distortion values of the points of the image with an extended depth of field in step 63 of the method 60.

In a first step 110, an image with an extended depth of field of a point grid is generated as calibration object. The image with an extended depth of field of the point grid is generated, such as in accordance with steps 64 to 70, with a point grid as workpiece 12. In particular, the image with an extended depth of field of the point grid, recorded in step 62 and 80, can be used in step 110.

In particular, with the exception of the distortion error, one or more of the imaging errors can already be corrected in the recorded image with an extended depth of field of the point grid. In particular, the astigmatism error can be corrected.

In a further step 112, the at least one distortion value for each image point of the image with an extended depth of field is determined on the basis of the recorded image with an extended depth of field of the point grid and the known form of the point grid, in particular the known arrangement or positions of the points of the point grid.

For example, a segmentation of the points of the point grid can first be carried out again for this purpose, as in step 82, in order to determine the image points of the image with an extended depth of field of the point grid that are in each case assigned to, and image, a point of the point grid. The positions of the points of the point grid can then be determined from the segmented image points. The determined position of each point of the point grid can then be compared with the known position of each point of the point grid. In this way, a distortion, i.e., an offset, between the determined and known positions of the points can be ascertained. It is then possible to determine therefrom at least one distortion value, in particular the first and second distortion values, for the point of the point grid. The distortion values of all image points of the image with an extended depth of field can then be determined over the entire region by interpolation.

With respect to FIGS. 7 to 10, it has already been explained in the introductory part how the measurement influences of the image field curvature and astigmatism affect the imaging of an object. The text below will once again explain with reference to FIGS. 11 to 17C how a measurable measurement recording, i.e., a corrected image with an extended depth of field, of a region of a surface of a workpiece can be recorded.

The first case under consideration is one in which the astigmatism is assumed to be vanishingly small and only image field curvature significantly influences the imaging. For this purpose, the image quality of the entire focal image stack is assessed and the corresponding measurement recording on the best setting plane having any desired curvature is calculated. This measurement recording is independent of the autofocus position. However, it has, in addition to the conventional distortion, an additional distortion due to a telecentricity error. This distortion influence must be calibrated and compensated.

To this end, a focal image stack of a calibration object is first recorded in a calibration process, as described above in FIG. 5. Next, a calibration recording on the best setting plane is calculated. In this case, an image with an extended depth of field of the calibration object is generated as the calibration recording. Next, the distortion of the image in the best setting plane is assessed. Here, at least one distortion value is ascertained for each point. The distortion values can then be stored in a look-up table.

Next, in a measurement process, the measurable recording, i.e., the corrected image with an extended depth of field, of a region of a surface of a workpiece can be recorded. First, a focal image stack of the workpiece is recorded. Then, a measurement recording on the best setting plane according to Petzval of any desired curvature is calculated. This is illustrated in example fashion in FIG. 11. An image with an extended depth of field is generated here as the measurement recording, for example using steps 42 to 50 of the method from FIG. 2. Subsequently, a distortion correction of the image in the best setting plane is carried out on the basis of the distortion values ascertained in the calibration process. In this way, it is then possible to generate an autofocus-independent measurement recording which has been corrected with respect to the telecentricity error, i.e., a corrected image with an extended depth of field. The distortion can be corrected, for example, as described in step 52 of the method from FIG. 2.

The procedure that is described enables the compensation of autofocus-dependent measurement errors and the generation of a measurable recording with an extended depth of field.

The next case under consideration is one in which both the astigmatism and the image field curvature influence the imaging. Due to these influences, the determined best image point will no longer lie on the best setting plane according to Petzval, but will, in dependence on the edge orientation, average out between the sagittal and the tangential best setting planes. In order to minimize telecentricity-related measurement influences, an astigmatically compensated (i.e., corrected) image with an extended depth of field should be determined. For this purpose, the image is evaluated not in the image plane that is sharpest in dependence on the edge orientation, but in the astigmatism-free best setting plane (Petzval shell). This is illustrated in example fashion in FIG. 12.

For this purpose, the astigmatic influences are assessed and calibrated in an initial step with the aid of a suitable calibration object, that is to say both the best setting plane and the astigmatic shell locations are determined.

In order to calculate an astigmatically compensated image with an extended depth of field of a region of a surface of a workpiece, first the sharpest image plane is determined and, in a subsequent correction step, this image position is shifted in dependence on the edge orientation into the astigmatically compensated setting plane. With the aid of the astigmatically compensated depth values of the setting plane, an astigmatically compensated image with an extended depth of field is generated.

Figure 13A:
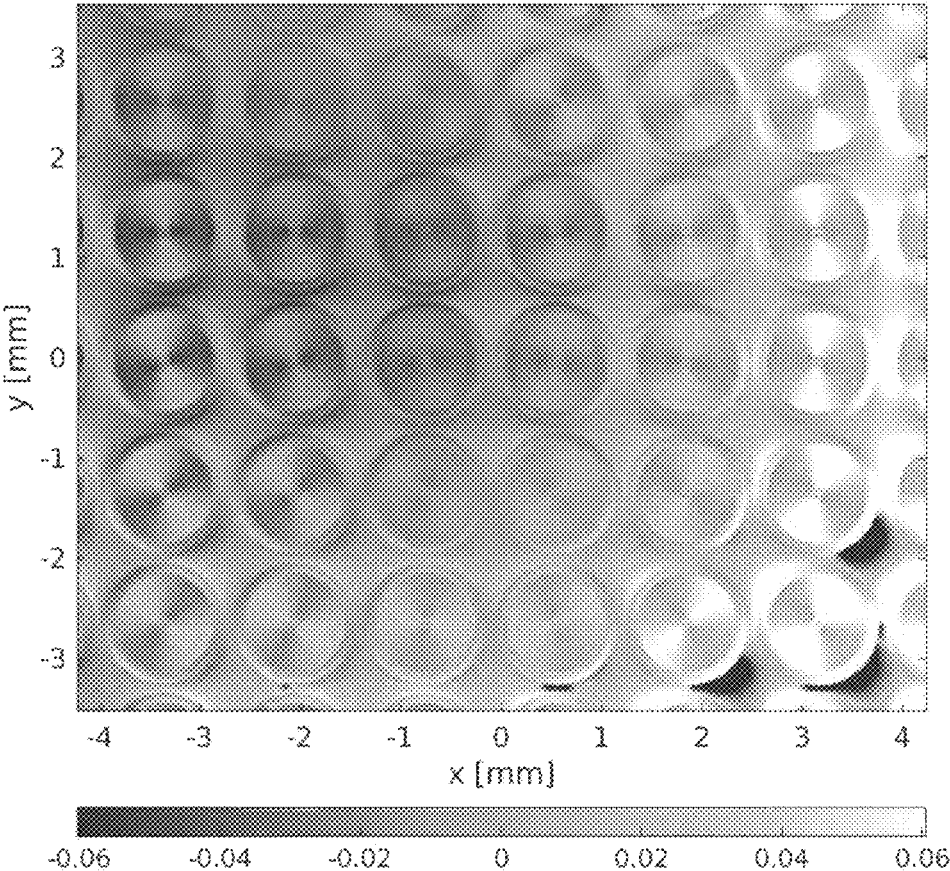
FIG. 13A shows a view of a depth map without correction of the astigmatism error.
Figure 13B:
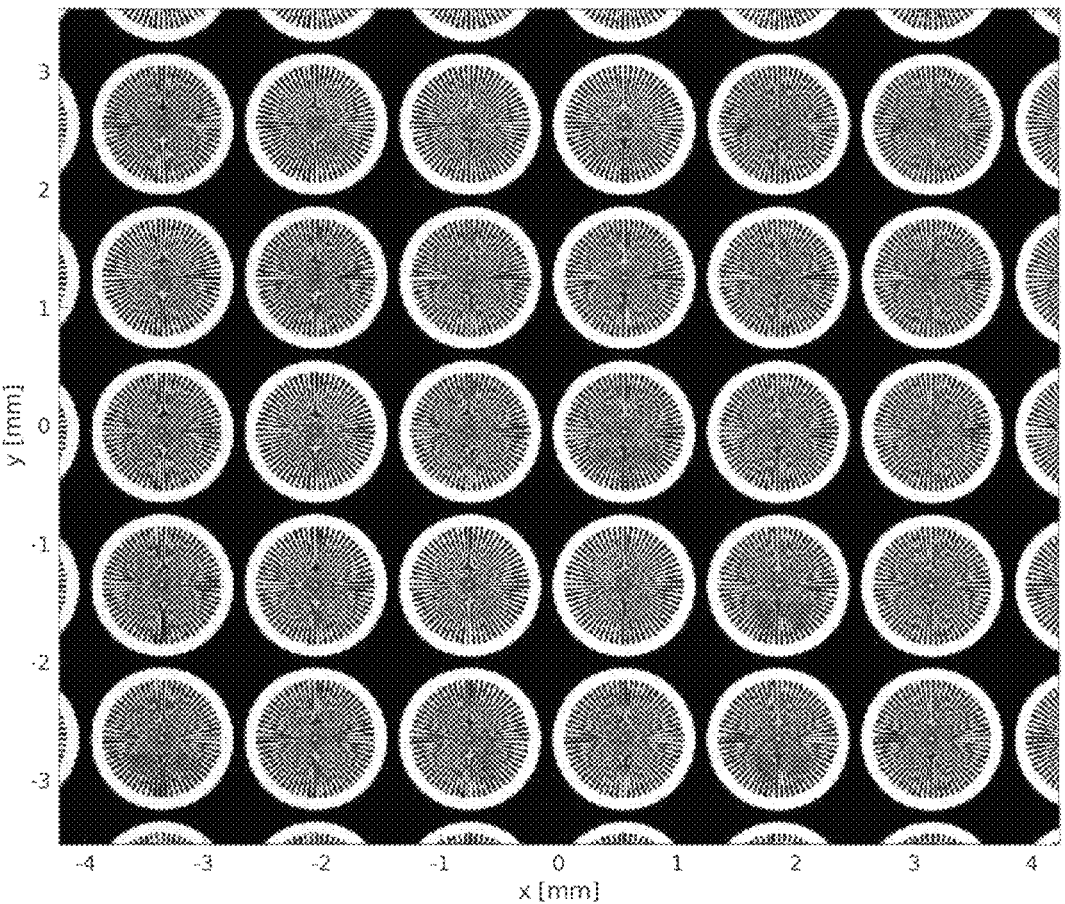
FIG. 13B shows a view of an image with an extended depth of field without correction of the astigmatism error.

The text below explains using a point grid as the workpiece by way of example how the astigmatism is corrected. The point grid is flat. FIG. 13B illustrates by way of example an uncorrected image with an extended depth of field of the point grid. FIG. 13A shows by way of example a depth map of the depth values of the object points of the imaged point grid on whose basis the image from FIG. 13B was generated. The depth map is not flat due to the astigmatic error.

Figure 14A:
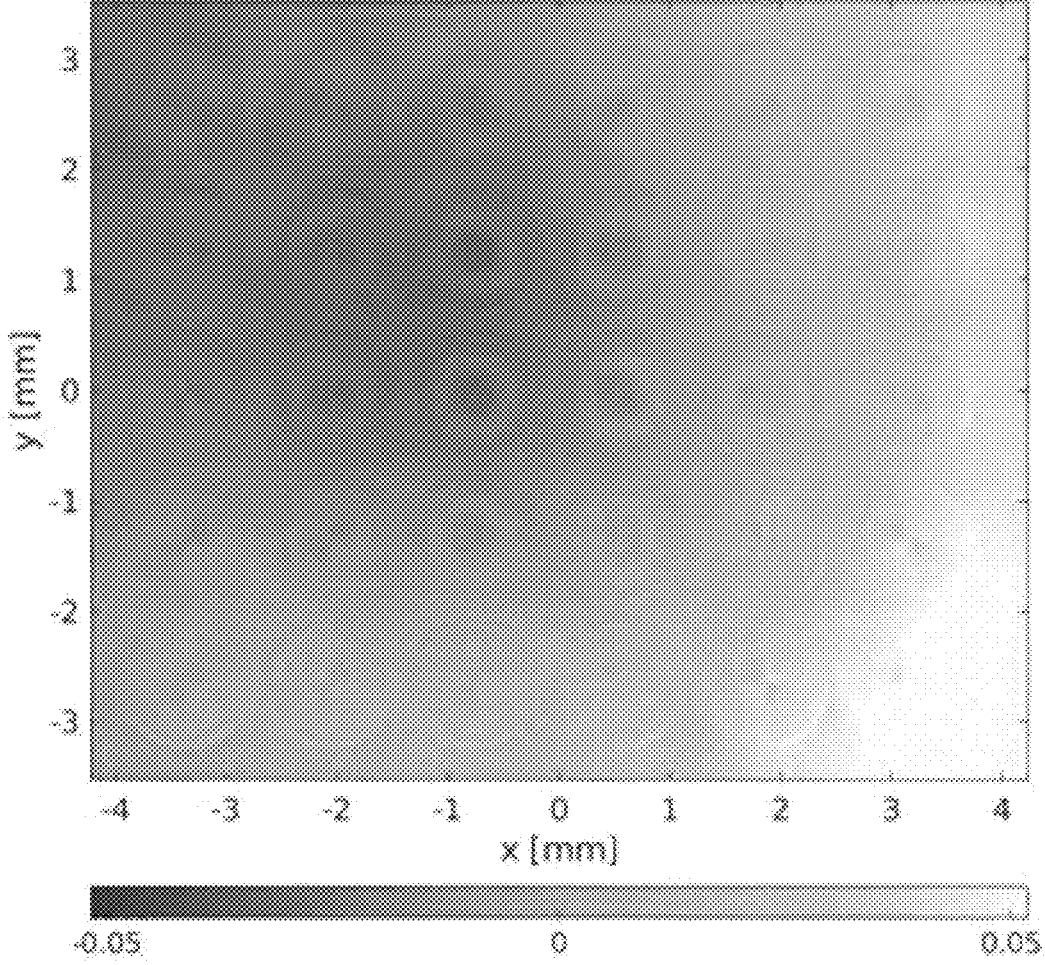
FIG. 14A shows a view of a depth map with correction of the astigmatism error.
Figure 14B:
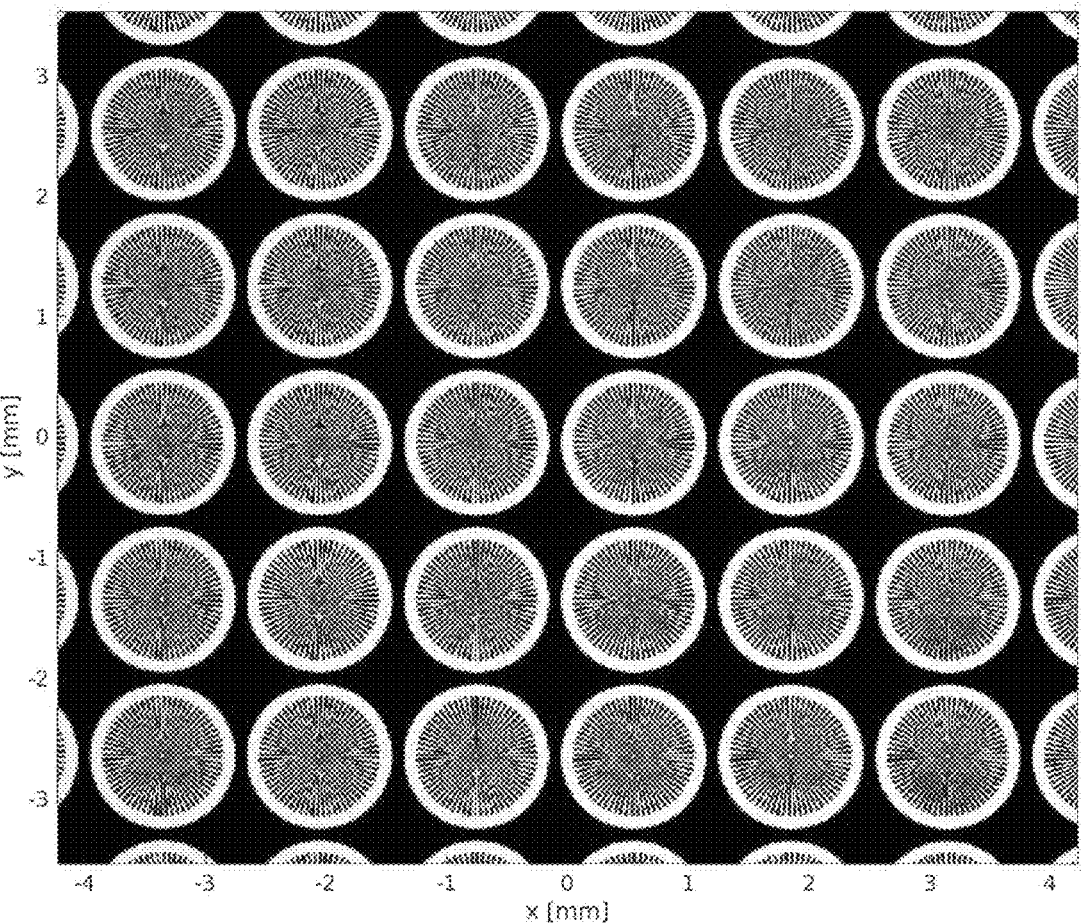
FIG. 14B shows a view of an image with an extended depth of field with correction of the astigmatism error.

FIG. 14B illustrates by way of example an image with an extended depth of field of the point grid which is astigmatically compensated with respect to the image from FIG. 13B. FIG. 14A shows by way of example a depth map of the astigmatically corrected depth values of the object points on whose basis the image from FIG. 14B was generated. The corrected depth map shows that the point grid is substantially flat.

Carrying out image computation or image analysis in the sharpest image plane according to the autofocus criterion, i.e., on the basis of the uncorrected depth values, is difficult because a computed image with an extended depth of field has a distortion in dependence on the edge orientation ("edge walking") due to astigmatic influences.

This is different for image computation or image analysis in the astigmatically compensated best setting plane, i.e., on the basis of the astigmatically compensated image with an extended depth of field. This is the result of a shift of the ascertained image position into the best setting plane. Here, the astigmatic walking effects are suppressed. A distortion correction in the astigmatically compensated image with an extended depth of field consequently generates a measurable recording which is focused everywhere.

In order to calculate the astigmatically compensated setting plane, an astigmatic correction value is ascertained on the basis of the local edge orientation in the image and subtracted from the depth value of the sharpest setting plane. The local edge orientation is approximated here by numerical approximation of the image gradient for example by directional Sobel filters in a single image or as weighted average of the gradients through a plurality of images of the focal image stack.

In order to find the edge orientation within an image, a gradient vector field is calculated for example with the aid of discrete differential operators $$[G_x, G_y] = [\partial_x \text{image}(x,y), \partial_y \text{image}(x,y)]$$

and the edge orientation angle thereof $$\theta = \arctan\left(\frac{G_x}{G_y}\right)$$

is determined.

The numerical determination of the gradient in the image is susceptible to noise and any interfering influences. This sensitively influences the calculated angle map and can falsify the astigmatic correction. In a worst-case scenario, an incorrectly determined angle can imply an incorrect correction step which increases the astigmatic measurement error.

A robust method consists in averaging the gradient vector fields over a plurality of image planes in a range of 1-10 rayleighs around the sharpest image point and to calculate the angle map from the averaged gradient vector field.

For correctional purposes, the astigmatic offset with respect to the best setting plane is generally determined with the aid of the determined edge orientation angle as follows:

$$dz(\theta,x,y) = \Sigma a_m(x,y)\sin(m\theta) + b_m(x,y)\cos(m\theta)$$

Here, m is a natural number and indicates the order of the expansion. The offset dz accordingly indicates for each object point (x, y) the effective correction value. Thus, when considering the expansion to the N-th order, each object point is then assigned N first correction values and N second correction values. In various implementations, the expansion only in the second order is considered. The astigmatic offset with respect to the best setting plane is then determined as follows:

$$dz(\theta,x,y) = a_2(x,y)\sin(2\theta) + b_2(x,y)\cos(2\theta)$$

The first correction value then corresponds to the coefficient $a_2$, and the second correction value then corresponds to the coefficient $b_2$.

The effective correction value is then subtracted from the determined position of maximum sharpness, i.e., the ascertained depth value of the object point. The position which has thus been newly determined, i.e., the astigmatically corrected depth value of the object point, is not compensated in the direction-dependent absolute sharpness point but with respect to astigmatically related telecentricity influences.

The astigmatically compensated image with an extended depth of field can then be generated on the basis of the astigmatically corrected depth values of the object points. In this way, the recording is no longer evaluated in the sharpest image plane but in the best setting plane. The effect of this is a slightly reduced image sharpness in the astigmatically compensated image with an extended depth of field, but it compensates for distortions or measurement errors due to telecentricity errors. In order to then obtain a measurable recording, the distortion is corrected in a final step. The distortion can be corrected, for example, as described in step 52 of the method from FIG. 2.

FIGS. 15A to 17C once again describe by way of example the procedure in a calibration process for determining the astigmatic correction values, i.e., the first and second correction values.

Figure 15B:
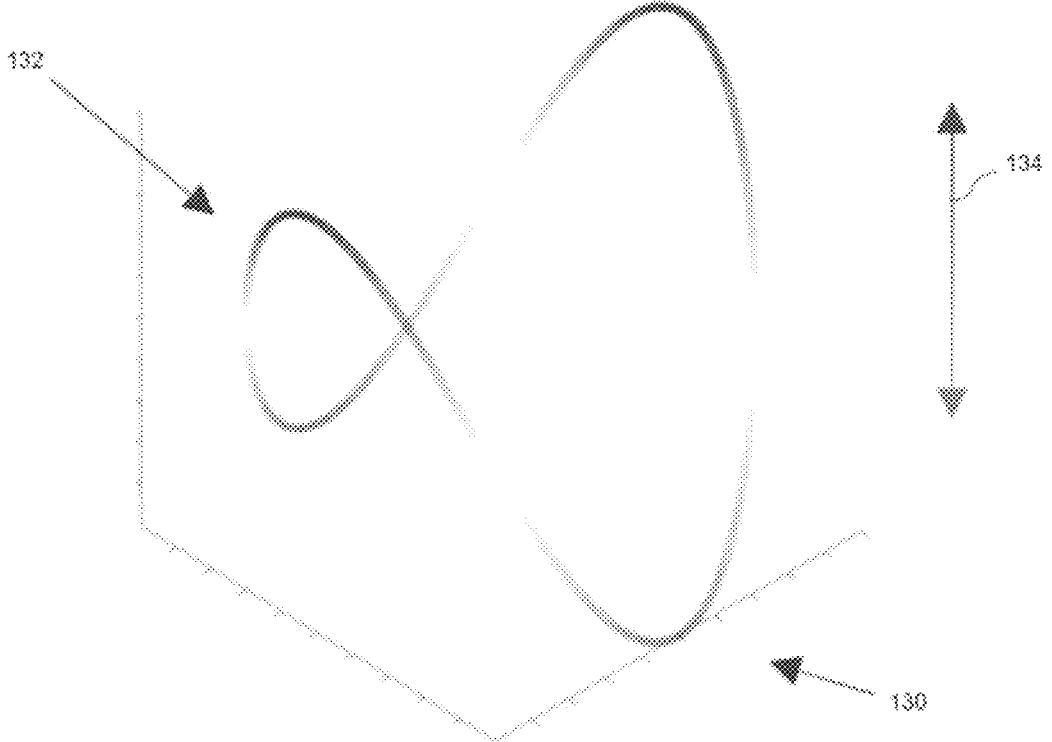
FIG. 15B shows a view of a 3D diagram for illustrating the sharpest image points of the edge of a point of the point grid from FIG. 15A.
Figure 15C:
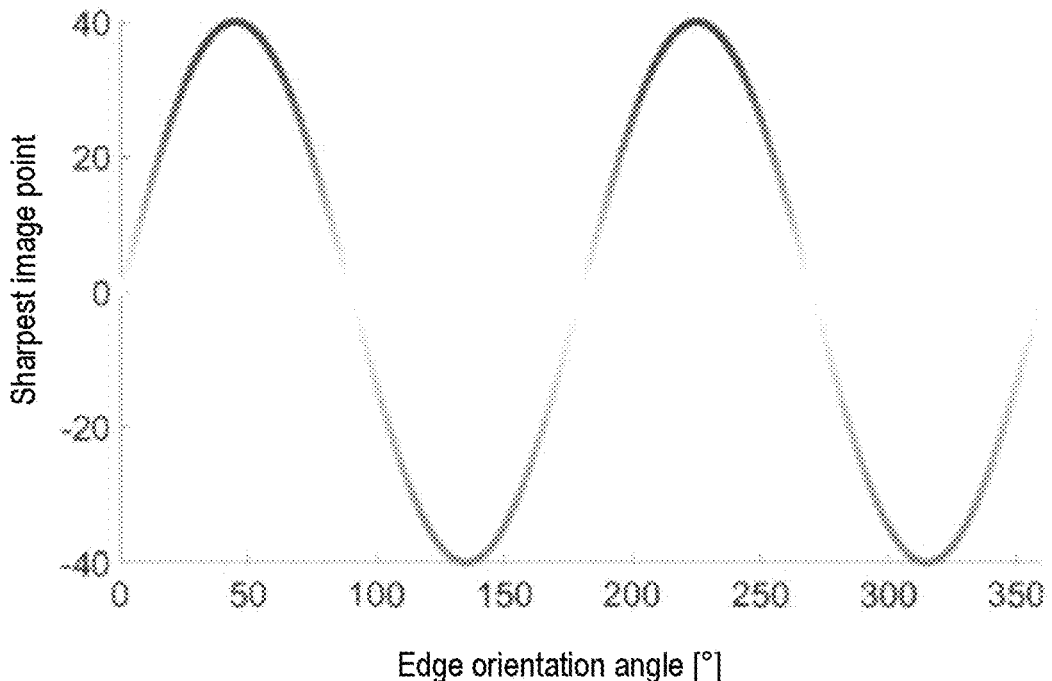
FIG. 15C shows a view of a diagram for illustrating the depth values of the sharpest image points from FIG. 15B over the respective edge orientation angle.

First, an image with an extended depth of field of a point grid is recorded. FIG. 15A shows an example illustration of a point grid. The point grid is flat. However, the astigmatism results in the image points that image a point of the point grid being shifted in an angle-dependent manner, i.e., in dependence on the orientation of the image point relative to the center point of the point of the point grid, in the depth direction depending on the angle in the direction of the tangential or sagittal focus. This is illustrated for example in FIGS. 15B and 15C. FIG. 15B shows a 3D diagram for illustrating the sharpest image points of the edge of a point of the point grid from FIG. 15A. FIG. 15C shows a diagram for illustrating the depth values of the sharpest image points from FIG. 15B over the respective edge orientation angle. FIGS. 15B and 15C show that the tangential focus 130 and the sagittal focus 132 are shifted in the depth direction 134.

A sum of sine functions $\Sigma a_m(x, y) \sin(m\theta)+b_m(x, y) \cos(m\theta)$, which may be second-order sine functions of the form $a_2(x, y) \sin(2\theta)+b_2(x, y) \cos(2\theta)$, is fitted to the determined depth values according to the astigmatism model. Using the fit, the expansion coefficients $a_m$ and $b_m$ are determined. The expansion coefficients describe the astigmatic, i.e., tangential and sagittal, best setting planes in dependence on the local edge orientation. The expansion coefficients thus correspond to astigmatic correction values for the positions of the respective points of the point grid in the image space. When considering the expansion only in the first order, the expansion coefficients $a_1$ and $b_1$ correspond to the first and second correction values at the location of the point of the point grid in the image space. When considering the expansion only in the second order, the expansion coefficients $a_2$ and $b_2$ correspond to the first and second correction values at the location of the point of the point grid in the image space. The first and second correction values for the image points of the image with an extended depth of field (for all image points in the image space) are then determined by interpolation over the entire region (the entire image space).

Figure 16A:
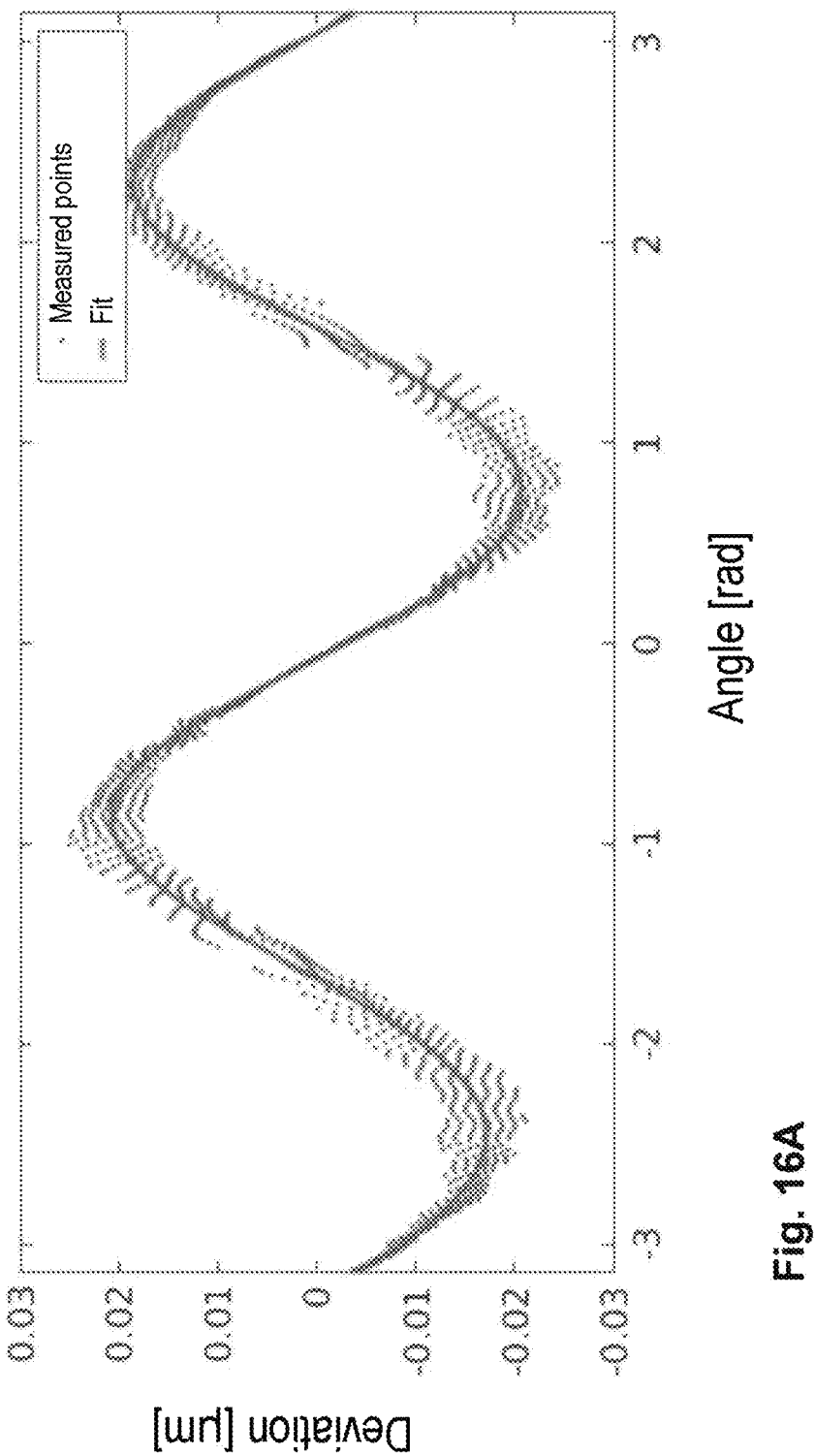
FIG. 16A shows a view of a first diagram according to a first example in which the fitting of a fit function to the depth values of the sharpest image points of the edge of a point of a point grid is illustrated.
Figures 16B, 16C:
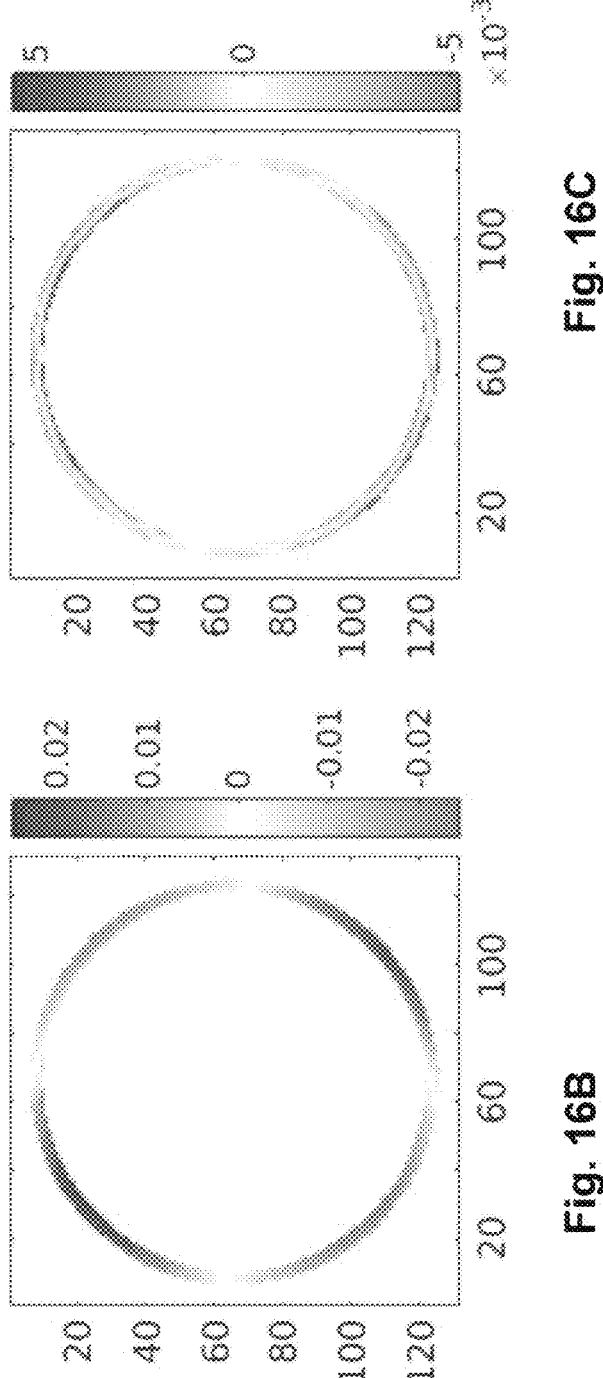
FIG. 16B shows a view of a second diagram according to the first example in which the spatial distribution of the depth values in the image plane (x-y plane) is illustrated.
FIG. 16C shows a view of a third diagram according to the first example in which the spatial distribution of corrected depth values in the image plane (x-y plane) is illustrated.

FIGS. 16A to 16C show a first example in which in each case a sum of sine functions (as a fit function) is fitted to the angle-dependent distribution of the depth values of a point of the point grid. FIG. 16A shows a diagram in which the fitting of the fit function to the depth values of the sharpest image points of the edge of a point of a point grid is illustrated. In other words, FIG. 16A shows the fit of the fit function to the angle-dependent distribution of the depth values. FIG. 16B shows a diagram in which the spatial distribution of the depth values in the image plane (x-y plane) is illustrated. FIG. 16C shows a diagram in which the spatial distribution of corrected depth values in the image plane (x-y plane) is illustrated. The corrected depth values are the result of the difference of the depth values with respect to the fit.

Figure 17A:
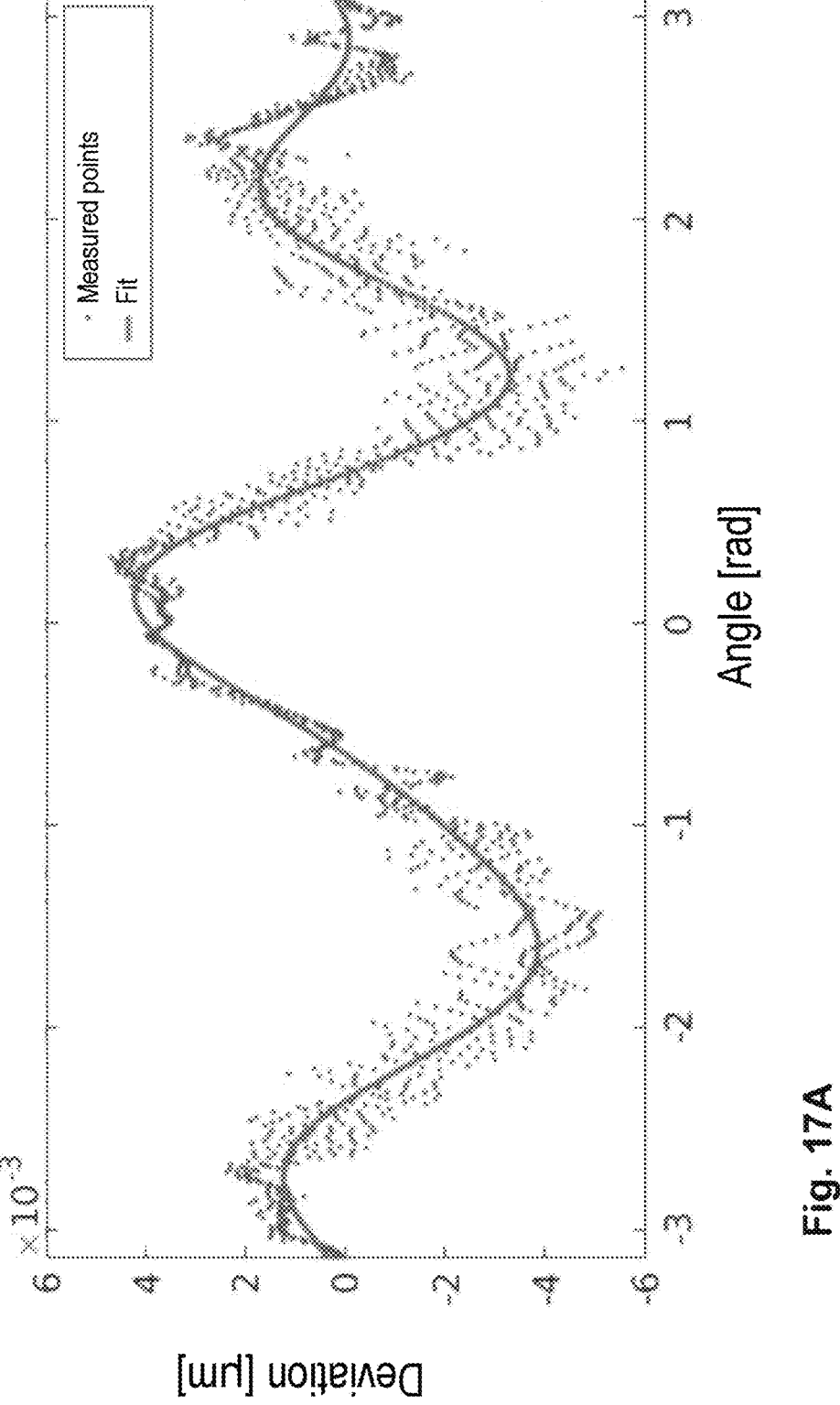
FIG. 17A shows a view of a first diagram according to a second example in which the fitting of a fit function to the depth values of the sharpest image points of the edge of a point of a point grid is illustrated.
Figures 17B, 17C:
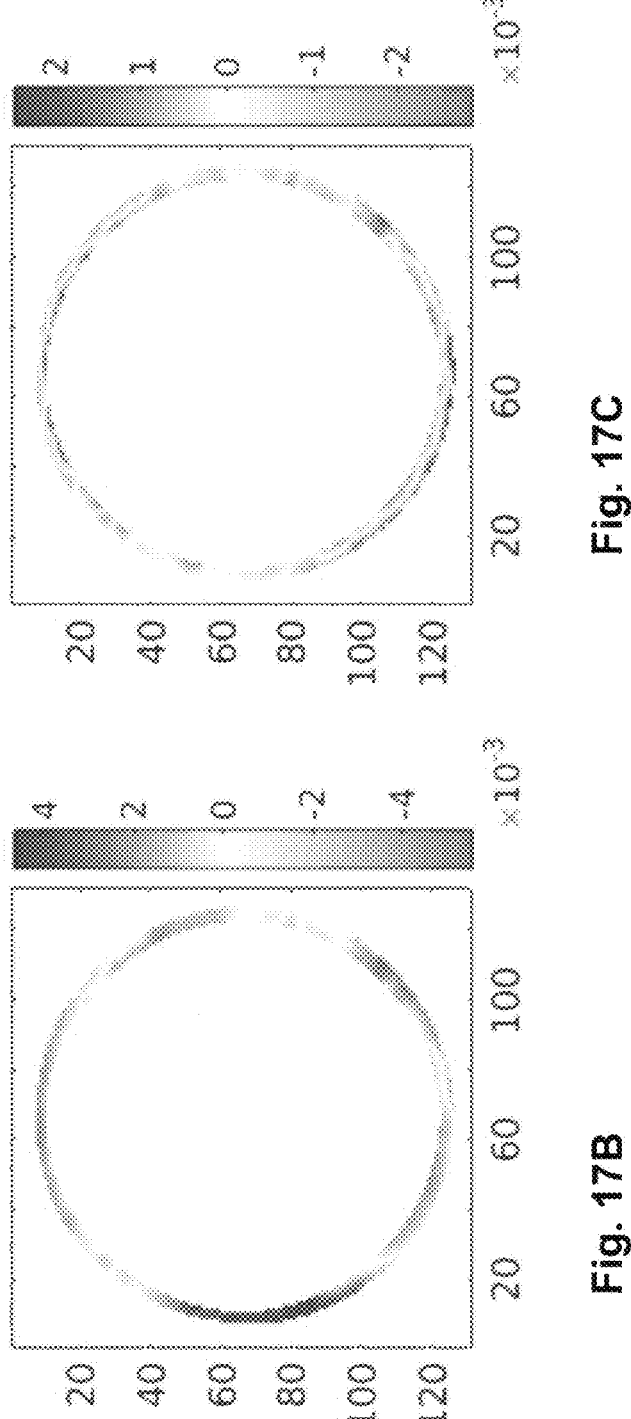
FIG. 17B shows a view of a second diagram according to the second example in which the spatial distribution of the depth values in the image plane (x-y plane) is illustrated.
FIG. 17C shows a view of a third diagram according to the second example in which the spatial distribution of corrected depth values in the image plane (x-y plane) is illustrated.

FIGS. 17A to 17C show a second example in which in each case a sum of sine functions (as a fit function) is fitted to the angle-dependent distribution of the depth values of a point of the point grid. FIG. 17A shows a diagram in which the fitting of the fit function to the depth values of the sharpest image points of the edge of a point of a point grid is illustrated. In other words, FIG. 17A shows the fit of the fit function to the angle-dependent distribution of the depth values. FIG. 17B shows a diagram in which the spatial distribution of the depth values in the image plane (x-y plane) is illustrated. FIG. 17C shows a diagram in which the spatial distribution of corrected depth values in the image plane (x-y plane) is illustrated. The corrected depth values are the result of the difference of the depth values with respect to the fit.

The term non-transitory computer-readable medium does not encompass transitory electrical or electromagnetic signals propagating through a medium (such as on a carrier wave). Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The phrase "at least one of A, B, and C" should be construed to mean a logical (A OR B OR C), using a non-exclusive logical OR, and should not be construed to mean "at least one of A, at least one of B, and at least one of C." The phrase "at least one of A, B, or C" should be construed to mean a logical (A OR B OR C), using a non-exclusive logical OR.

The invention claimed is:

1. A computer-implemented method comprising:
receiving a focal image stack, wherein:
    the focal image stack includes a plurality of images of a measurement object,
    each of the plurality of images captures a region of a surface of the measurement object with a defined focal plane position in a depth direction, and
    the defined focal plane positions of the plurality of images are different from each other;
generating an initial image with an extended depth of field in the depth direction based on the focal image stack;
generating a corrected image by correcting a set of imaging errors in the initial image, wherein:
    the set of imaging errors includes a distortion error, and
    image points of the plurality of images are assigned to corresponding object points on the surface of the measurement object;
determining a sharpness value of each of the image points;
ascertaining a depth value of each of the object points in the depth direction based on the determined sharpness values, wherein the initial image is generated based on the ascertained depth values and the focal image stack; and
for each subset of the image points that is assigned to a common point of the object points, fitting a function for the common point along the depth direction to the sharpness values of the subset of the image points, wherein, for each object point of the object points, ascertaining the depth value of the object point includes:
    in response to a residual of the fitted function that corresponds to the object point being greater than a threshold value, ascertaining the depth value of the object point based on a maximum of the fitted function; and
    in response to the residual of the fitted function being less than or equal to the threshold value, interpolating the depth values of at least two neighboring ones of the object points.

2. The method of claim 1 further comprising, for each image of the focal image stack, assigning the image a depth value in the depth direction.

3. The method of claim 1 wherein, for each image point of the image points, the sharpness value of the image point is determined based on a sharpness of the image point.

4. The method of claim 1 wherein correcting the distortion error includes, for each point of the initial image:
assigning at least one distortion value to the point; and
correcting the point perpendicular to the depth direction based on the at least one distortion value.

5. The method of claim 1 wherein the set of imaging errors includes an astigmatism error.

6. The method of claim 5 wherein the astigmatism error is corrected before correction of the distortion error.

7. The method of claim 1 further comprising:
generating the focal image stack by capturing the plurality of images in the focal stack using an optical sensor, wherein:
    each of the plurality of images captures the region of the surface of the measurement object with a respective focal plane position, and the respective focal plane positions of the plurality of images are different.

8. The method of claim 7 wherein:

the optical sensor and the measurement object are movable relative to one another in the depth direction such that a distance in the depth direction between the measurement object and the optical sensor is variable;

the method further comprises varying the distance between the measurement object and the optical sensor;

the plurality of images are captured while the distance between the measurement object and the optical sensor is varied; and the images each capture the region of the surface of the measurement object at different, defined distances from the measurement object in the depth direction.

9. The method of claim 7 further comprising illuminating the measurement object using an illumination device while capturing the plurality of images of the focal image stack.

10. The method of claim 7 further comprising:

determining a distortion value for each image point of the initial image; and recording a calibration image of a calibration object, wherein the distortion value is determined based on a deviation of the calibration image with respect to a known surface profile of the calibration object.

11. The method of claim 7 further comprising:

determining first and second correction values for each image point; and recording a calibration image of a calibration object, wherein respective ones of the first and second correction values are determined based on deviations of the initial image or determined depth values of the object points of the calibration object with respect to a known surface profile of the calibration object.

12. A computer-implemented method comprising:

receiving a focal image stack, wherein:

the focal image stack includes a plurality of images of a measurement object, each of the plurality of images captures a region of a surface of the measurement object with a defined focal plane position in a depth direction, and the defined focal plane positions of the plurality of images are different from each other;

generating an initial image with an extended depth of field in the depth direction based on the focal image stack; and generating a corrected image by correcting a set of imaging errors in the initial image, wherein:

the set of imaging errors includes a distortion error, correcting the distortion error includes, for each point of the initial image:

assigning at least one distortion value to the point, and correcting the point perpendicular to the depth direction based on the at least one distortion value, and correcting the distortion error includes, for each point of the initial image:

assigning a first distortion value and a second distortion value to the point; and correcting a position of the point in (i) a first direction based on the first distortion value and (ii) a second direction based on the second distortion value.

13. A computer-implemented method comprising:

receiving a focal image stack, wherein:

the focal image stack includes a plurality of images of a measurement object, each of the plurality of images captures a region of a surface of the measurement object with a defined focal plane position in a depth direction, and the defined focal plane positions of the plurality of images are different from each other;

generating an initial image with an extended depth of field in the depth direction based on the focal image stack; and generating a corrected image by correcting a set of imaging errors in the initial image, wherein:

the set of imaging errors includes a distortion error, the set of imaging errors includes an astigmatism error, and correcting the astigmatism error includes:

generating an angle map of the region of the surface of the measurement object; and for each point of the initial image:

assigning a first correction value and a second correction value to the point, and correcting a depth value of the point based on the first correction value, the second correction value, and the angle map.

14. A computer-implemented method comprising:

receiving a focal image stack, wherein:

the focal image stack includes a plurality of images of a measurement object, each of the plurality of images captures a region of a surface of the measurement object with a defined focal plane position in a depth direction, and the defined focal plane positions of the plurality of images are different from each other;

generating an initial image with an extended depth of field in the depth direction based on the focal image stack;

generating a corrected image by correcting a set of imaging errors in the initial image, wherein:

the set of imaging errors includes a distortion error, and the set of imaging errors includes an astigmatism error, generating the focal image stack by capturing the plurality of images in the focal stack using an optical sensor, wherein:

each of the plurality of images captures the region of the surface of the measurement object with a respective focal plane position, and the respective focal plane positions of the plurality of images are different, determining first and second correction values for each image point; and recording a calibration image of a calibration object, wherein:

respective ones of the first and second correction values are determined based on deviations of the initial image or determined depth values of the object points of the calibration object with respect to a known surface profile of the calibration object, the calibration image includes a point grid, and determining the first and second correction values includes:

for each point of the point grid, determining a first point correction value and a second point correction value based on a cost function between an astigmatism model and depth values of the point, and interpolating the first and second correction values based on the first and second point correction values of each point of the point grid.

15. A measuring apparatus comprising:
a measurement object holder for a measurement object;
an optical sensor; and
a control device, wherein:
   the optical sensor and the measurement object are spaced apart from one another in a depth direction,
   the optical sensor is configured to capture a plurality of images of a region of a surface of a measurement object,
   the plurality of images form a focal image stack and have defined focal plane positions that are different in the depth direction,
   the control device is configured to:
      generate an initial image with an extended depth of field in the depth direction based on the focal image stack; and
      generate a corrected image by correcting a set of imaging errors in the initial image,
   the set of imaging errors includes a distortion error,
   image points of the plurality of images are assigned to corresponding object points on the surface of the measurement object;
   the control device is configured to:
      determine a sharpness value of each of the image points, and
      ascertain a depth value of each of the object points in the depth direction based on the determined sharpness values;
   the initial image is generated based on the ascertained depth values and the focal image stack,
   the control device is configured to:
      for each subset of the image points that is assigned to a common point of the object points, fit a function for the common point along the depth direction to the sharpness values of the subset of the image points, and
      for each object point of the object points, ascertaining the depth value of the object point includes:
         in response to a residual of the fitted function that corresponds to the object point being greater than a threshold value, ascertaining the depth value of the object point based on a maximum of the fitted function; and
         in response to the residual of the fitted function being less than or equal to the threshold value, interpolating the depth values of at least two neighboring ones of the object points.

16. The measuring apparatus of claim 15 wherein the measuring apparatus includes at least one of a coordinate measuring machine or a microscope.

17. The measuring apparatus of claim 15 further comprising a drive device configured to move the optical sensor and the measurement object holder relative to one another in the depth direction in order to vary a distance between the measurement object and the optical sensor.

18. The measuring apparatus of claim 17 wherein:
the control device is configured to control the drive device to vary the distance between the measurement object and the optical sensor;
the optical sensor is controlled so that the plurality of images is captured while the distance between the measurement object and the optical sensor is varied; and
the plurality of images captures the region of the surface of the measurement object at different, defined distances from the measurement object in the depth direction.

19. A non-transitory computer-readable medium comprising computer-executable instructions including:
receiving a focal image stack, wherein:
   the focal image stack includes a plurality of images of a measurement object,
   each of the plurality of images captures a region of a surface of the measurement object with a defined focal plane position in a depth direction, and
   the defined focal plane positions of the plurality of images are different from each other;
generating an initial image with an extended depth of field in the depth direction based on the focal image stack;
generating a corrected image by correcting a set of imaging errors in the initial image, wherein:
   the set of imaging errors includes a distortion error, and
   image points of the plurality of images are assigned to corresponding object points on the surface of the measurement object:
determining a sharpness value of each of the image points;
ascertaining a depth value of each of the object points in the depth direction based on the determined sharpness values, wherein the initial image is generated based on the ascertained depth values and the focal image stack; and
for each subset of the image points that is assigned to a common point of the object points, fitting a function for the common point along the depth direction to the sharpness values of the subset of the image points, wherein, for each object point of the object points, ascertaining the depth value of the object point includes:
   in response to a residual of the fitted function that corresponds to the object point being greater than a threshold value, ascertaining the depth value of the object point based on a maximum of the fitted function; and
   in response to the residual of the fitted function being less than or equal to the threshold value, interpolating the depth values of at least two neighboring ones of the object points.

20. A measuring apparatus comprising:
a measurement object holder for a measurement object;
an optical sensor; and
a control device, wherein:
   the optical sensor and the measurement object are spaced apart from one another in a depth direction,
   the optical sensor is configured to capture a plurality of images of a region of a surface of a measurement object,
   the plurality of images form a focal image stack and have defined focal plane positions that are different in the depth direction,
   the control device is configured to:
      generate an initial image with an extended depth of field in the depth direction based on the focal image stack; and
      generate a corrected image by correcting a set of imaging errors in the initial image,
   the set of imaging errors includes a distortion error,
   correcting the distortion error includes, for each point of the initial image:
      assigning at least one distortion value to the point; and
      correcting the point perpendicular to the depth direction based on the at least one distortion value, and correcting the distortion error includes, for each point of the initial image:

assigning a first distortion value and a second distortion value to the point; and correcting a position of the point in (i) a first direction based on the first distortion value and (ii) a second direction based on the second distortion value.

21. A measuring apparatus comprising:

a measurement object holder for a measurement object;

an optical sensor; and a control device, wherein:

the optical sensor and the measurement object are spaced apart from one another in a depth direction, the optical sensor is configured to capture a plurality of images of a region of a surface of a measurement object, the plurality of images form a focal image stack and have defined focal plane positions that are different in the depth direction, the control device is configured to:

generate an initial image with an extended depth of field in the depth direction based on the focal image stack; and generate a corrected image by correcting a set of imaging errors in the initial image, the set of imaging errors includes a distortion error, the set of imaging errors includes an astigmatism error, and correcting the astigmatism error includes:

generating an angle map of the region of the surface of the measurement object; and for each point of the initial image:

assigning a first correction value and a second correction value to the point, and correcting a depth value of the point based on the first correction value, the second correction value, and the angle map.

22. A measuring apparatus comprising:

a measurement object holder for a measurement object;

an optical sensor; and a control device, wherein:

the optical sensor and the measurement object are spaced apart from one another in a depth direction, the optical sensor is configured to capture a plurality of images of a region of a surface of a measurement object, the plurality of images form a focal image stack and have defined focal plane positions that are different in the depth direction, the control device is configured to:

generate an initial image with an extended depth of field in the depth direction based on the focal image stack; and generate a corrected image by correcting a set of imaging errors in the initial image, the set of imaging errors includes a distortion error, the set of imaging errors includes an astigmatism error, the control device is configured to generate the focal image stack by capturing the plurality of images in the focal stack using an optical sensor, each of the plurality of images captures the region of the surface of the measurement object with a respective focal plane position, the respective focal plane positions of the plurality of images are different, the control device is configured to:

determine first and second correction values for each image point; and record a calibration image of a calibration object, respective ones of the first and second correction values are determined based on deviations of the initial image or determined depth values of the object points of the calibration object with respect to a known surface profile of the calibration object, the calibration image includes a point grid, and determining the first and second correction values includes:

for each point of the point grid, determining a first point correction value and a second point correction value based on a cost function between an astigmatism model and depth values of the point, and interpolating the first and second correction values based on the first and second point correction values of each point of the point grid.

23. A non-transitory computer-readable medium comprising computer-executable instructions including:

receiving a focal image stack, wherein:

the focal image stack includes a plurality of images of a measurement object, each of the plurality of images captures a region of a surface of the measurement object with a defined focal plane position in a depth direction, and the defined focal plane positions of the plurality of images are different from each other;

generating an initial image with an extended depth of field in the depth direction based on the focal image stack; and generating a corrected image by correcting a set of imaging errors in the initial image, wherein:

the set of imaging errors includes a distortion error, correcting the distortion error includes, for each point of the initial image:

assigning at least one distortion value to the point; and correcting the point perpendicular to the depth direction based on the at least one distortion value, and correcting the distortion error includes, for each point of the initial image:

assigning a first distortion value and a second distortion value to the point; and correcting a position of the point in (i) a first direction based on the first distortion value and (ii) a second direction based on the second distortion value.

24. A non-transitory computer-readable medium comprising computer-executable instructions including:

receiving a focal image stack, wherein:

the focal image stack includes a plurality of images of a measurement object, each of the plurality of images captures a region of a surface of the measurement object with a defined focal plane position in a depth direction, and the defined focal plane positions of the plurality of images are different from each other;

generating an initial image with an extended depth of field in the depth direction based on the focal image stack; and generating a corrected image by correcting a set of imaging errors in the initial image, wherein:

the set of imaging errors includes a distortion error, the set of imaging errors includes an astigmatism error, and correcting the astigmatism error includes:

generating an angle map of the region of the surface of the measurement object; and for each point of the initial image:

assigning a first correction value and a second correction value to the point, and correcting a depth value of the point based on the first correction value, the second correction value, and the angle map.

25. A non-transitory computer-readable medium comprising computer-executable instructions including:

receiving a focal image stack, wherein:

the focal image stack includes a plurality of images of a measurement object, each of the plurality of images captures a region of a surface of the measurement object with a defined focal plane position in a depth direction, and the defined focal plane positions of the plurality of images are different from each other;

generating an initial image with an extended depth of field in the depth direction based on the focal image stack;

generating a corrected image by correcting a set of imaging errors in the initial image, wherein:

the set of imaging errors includes a distortion error, and the set of imaging errors includes an astigmatism error;

generating the focal image stack by capturing the plurality of images in the focal stack using an optical sensor, wherein:

each of the plurality of images captures the region of the surface of the measurement object with a respective focal plane position, and the respective focal plane positions of the plurality of images are different;

determining first and second correction values for each image point; and recording a calibration image of a calibration object, wherein:

respective ones of the first and second correction values are determined based on deviations of the initial image or determined depth values of the object points of the calibration object with respect to a known surface profile of the calibration object, the calibration image includes a point grid, and determining the first and second correction values includes:

for each point of the point grid, determining a first point correction value and a second point correction value based on a cost function between an astigmatism model and depth values of the point, and interpolating the first and second correction values based on the first and second point correction values of each point of the point grid.

\* \* \* \* \*